(12) United States Patent
Baker et al.

(10) Patent No.: US 8,424,570 B2
(45) Date of Patent: Apr. 23, 2013

(54) PIPE THREAD PROTECTOR

(75) Inventors: Bryan C. Baker, Houston, TX (US);
David W. Clem, Spring, TX (US);
Jeffrey D. Lendermon, Missouri City, TX (US)

(73) Assignee: Drilltec Patents & Technologies Corporation, Houston, TX (US)

( * ) Notice: Subject to any disclaimer, the term of this patent is extended or adjusted under 35 U.S.C. 154(b) by 133 days.

(21) Appl. No.: 13/099,508

(22) Filed: May 3, 2011

(65) Prior Publication Data

US 2011/0265904 A1 Nov. 3, 2011

Related U.S. Application Data

(60) Provisional application No. 61/330,519, filed on May 3, 2010.

(51) Int. Cl.
*B65D 59/06* (2006.01)

(52) U.S. Cl.
USPC ........... 138/96 T; 138/96 R; 138/89; 220/213

(58) Field of Classification Search ................. 138/96 T, 138/96 R, 89; 220/213
See application file for complete search history.

(56) References Cited

U.S. PATENT DOCUMENTS

| | | | |
|---|---|---|---|
| 1,776,528 A | 9/1930 | Unke | |
| 1,853,946 A | 4/1932 | Unke | |
| 4,079,756 A * | 3/1978 | Smiley | ........................ 138/96 T |
| 4,139,023 A | 2/1979 | Turley | |
| 4,501,301 A | 2/1985 | Snow, Sr. et al. | |
| 4,553,567 A | 11/1985 | Telander | |
| 4,809,752 A | 3/1989 | Strödter | |
| 4,957,141 A | 9/1990 | Dreyfuss et al. | |
| 5,195,562 A | 3/1993 | Dreyfuss et al. | |
| 5,244,015 A | 9/1993 | Dreyfuss et al. | |
| 6,142,186 A * | 11/2000 | Donovan | ........................ 138/89 |
| 7,469,721 B2 * | 12/2008 | Takano | ........................ 138/96 T |
| 2011/0265904 A1 * | 11/2011 | Baker et al. | .................. 138/96 T |

FOREIGN PATENT DOCUMENTS

JP 2001199469 A 7/2001

OTHER PUBLICATIONS

PCT/US2011/034891 International Search Report and Written Opinion, Jan. 11, 2012 (9 p.).

* cited by examiner

*Primary Examiner* — Patrick F Brinson
(74) *Attorney, Agent, or Firm* — Conley Rose, P.C.

(57) ABSTRACT

A protector for protecting a pipe thread having a thread pitch $P_1$ has a central axis, a first end, second end opposite the first end, and comprises a base at the first end. In addition, the protector comprises an annular connecting member extending axially from the base to the second end. The connecting member has a radially inner surface and a radially outer surface. The connecting member also includes a helical thread extending radially outward from the radially inner surface or radially inward from the radially outer surface. The helical thread has a thread pitch $P_2$ that is greater than the thread pitch $P_1$ of the pipe thread.

25 Claims, 20 Drawing Sheets

PIPE THREAD PROTECTOR

CROSS-REFERENCE TO RELATED APPLICATIONS

This application claims benefit of U.S. provisional patent application Ser. No. 61/330,519 filed May 3, 2010, and entitled "Pipe Thread Protector," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to devices for protecting the ends of pipes. More particularly, the invention relates to devices for protecting the threads on the ends of pipes.

2. Background of the Technology

Pipes, such as pipes used for oil and gas drilling and production, are often produced in sections and are axially connected end-to-end. Typically, the connection involves the use of a male, externally threaded portion at one end of one pipe section that is threadingly engageable with a mating female, internally threaded portion at the end of an axially adjacent pipe section. The male, externally threaded end of a pipe is often referred to as the "pin end," and the female, internally threaded end of a pipe is often referred to as the "box end."

The ends of the pipe, including the threads, are subject to damage when not in actual use, such as from corrosion, impacts with other objects, or from being dropped, during transportation and storage. Such damage may render the pipe faulty or unusable, resulting in delay, hardship and increased expense. Devices known as "thread protectors" are commonly used to protect the ends of the pipe, and in particular, to protect the internal and external threads on the ends of the pipe from such damage. A "pin end" thread protector is connected to and protects the pin end of the pipe and associated external threads, and a "box end" thread protector is connected to and protects the box end of the pipe and associated internal threads. The thread protectors are designed to prevent damage to the respective pipe ends when the pipe impacts other objects, the ground or otherwise is subjected to external impacts. In addition, the thread protectors are designed to seal the ends of the pipe to reduce the potential for premature corrosion of the pipe and/or threads.

Pipes used for oil and gas drilling and production can vary in nominal diameter from two inches to over thirty inches. Further, many pipe manufacturing companies and exploration and production (E&P) companies have developed proprietary thread forms dictating thread geometry (e.g., square threads, trapezoidal threads), thread size (e.g., thread height), and thread pitch (e.g., threads per inch). In addition, the American Petroleum Institute (API) has several thread form standards. As a result, there are over 3000 different combinations of pipe diameters and thread forms.

To protect both the pin end and box end of a pipe section, conventional thread protectors typically come in two parts—a pin end thread protector that is disposed about the pin end of the pipe and includes internal threads that engage the external threads on the pin end; and a box end thread protector that is positioned in the box end of the pipe and includes external threads that engage the internal threads on the box end. The pin end thread protector is sized, configured, and designed such that its internal threads mate with the external threads of the pin end; and the box end thread protector is sized, configured, and designed such that its external threads mate with the internal threads of the box end. In other words, the internal threads of the pin end protector fit between the external threads of the pin end as the pin end protector is threaded onto the pin end, and the external threads of the box end protector fit between the internal threads of the box end as the box end protector is threaded onto the box end. For example, FIG. 1A illustrates a conventional pin end thread protector 10 disposed about a pin end 20 of a pipe section 50. Pin end thread protector 10 includes internal threads 11 that mate and engage with external threads 21 on pin end 20. Specifically, internal threads 11 are designed to have the same thread pitch as external threads 21, and to have a size and geometry that allows internal threads 11 to fit between and mate with external threads 21 of pin end 20. In FIG. 1B, a conventional box end thread protector 30 is shown disposed about a box end 40 of pipe section 50. Box end thread protector 30 includes external threads 31 that mate and engage with internal threads 41 on box end 30. Specifically, external threads 31 are designed to have the same thread pitch as internal threads 41, and to have a size and geometry that allows external threads 31 to fit between and mate with internal threads 41 of box end 40.

As previously described, there are over 3000 different combinations of pipe diameter and thread form. Accordingly, there are hundreds of different thread protectors, each sized, configured, and designed to mate with the particular combination of pipe diameter and pipe thread form. Significant time and expense are associated with the manufacture of such a large number of different thread protectors, as well as the storage of such a large number of different thread protectors.

Accordingly, there remains a need in the art for a single thread protector capable of protecting pipe ends having different thread forms. Such thread protectors would be particularly well received if they offered the potential to reduce manufacturing costs and inventory costs, and were configured for multiple re-uses.

BRIEF SUMMARY OF THE DISCLOSURE

These and other needs in the art are addressed in one embodiment by a protector for protecting a pipe thread having a thread pitch $P_1$. The protector has a central axis, a first end, and second end opposite the first end. In an embodiment, the protector comprises a base at the first end. In addition, the protector comprises an annular connecting member extending axially from the base to the second end. The connecting member has a radially inner surface and a radially outer surface. The connecting member also includes a helical thread extending radially outward from the radially outer surface or radially inward from the radially inner surface. The helical thread has a thread pitch $P_2$ that is greater than the thread pitch $P_1$ of the pipe thread.

These and other needs in the art are addressed in another embodiment by a method for protecting a pipe thread. In an embodiment, the method comprises (a) providing a thread protector having a central axis. The thread protector includes a base and an annular body extending axially from the base. The body having a radially inner surface and a radially outer surface. The thread protector also includes a helical thread extending radially from the radially inner surface of the body or the radially outer surface of the body. In addition, the method comprises (b) intentionally cross-threading the helical thread and a pipe thread on an end of a first pipe.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1A:
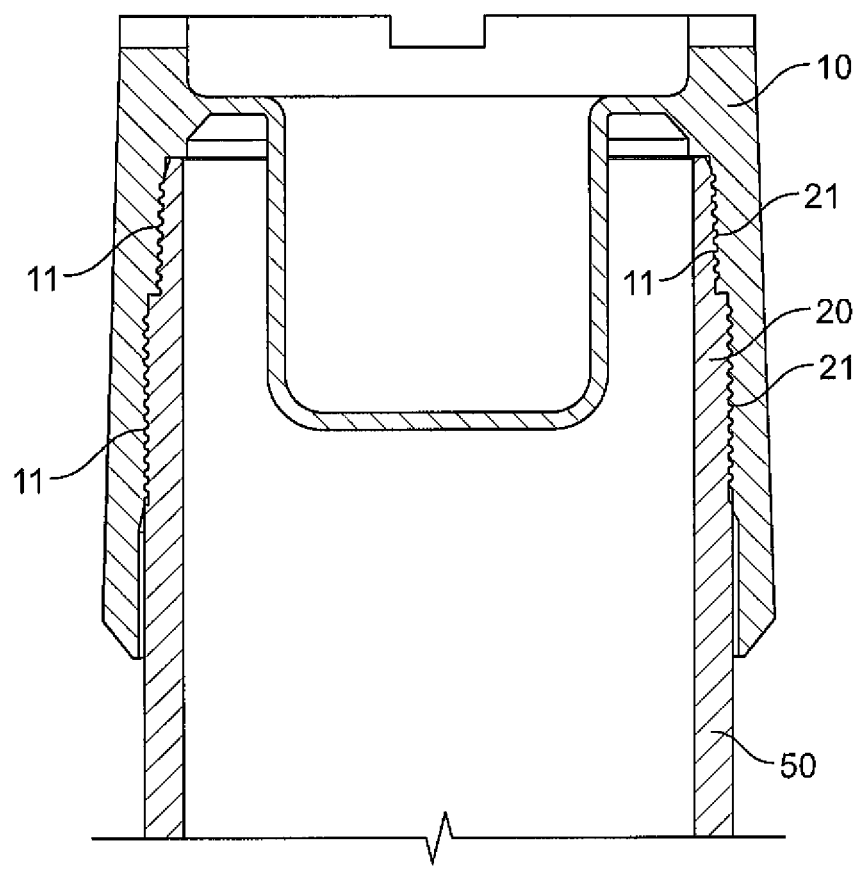
FIG. 1A is a partial cross-sectional view of a conventional pin end thread protector.
Figure 1B:
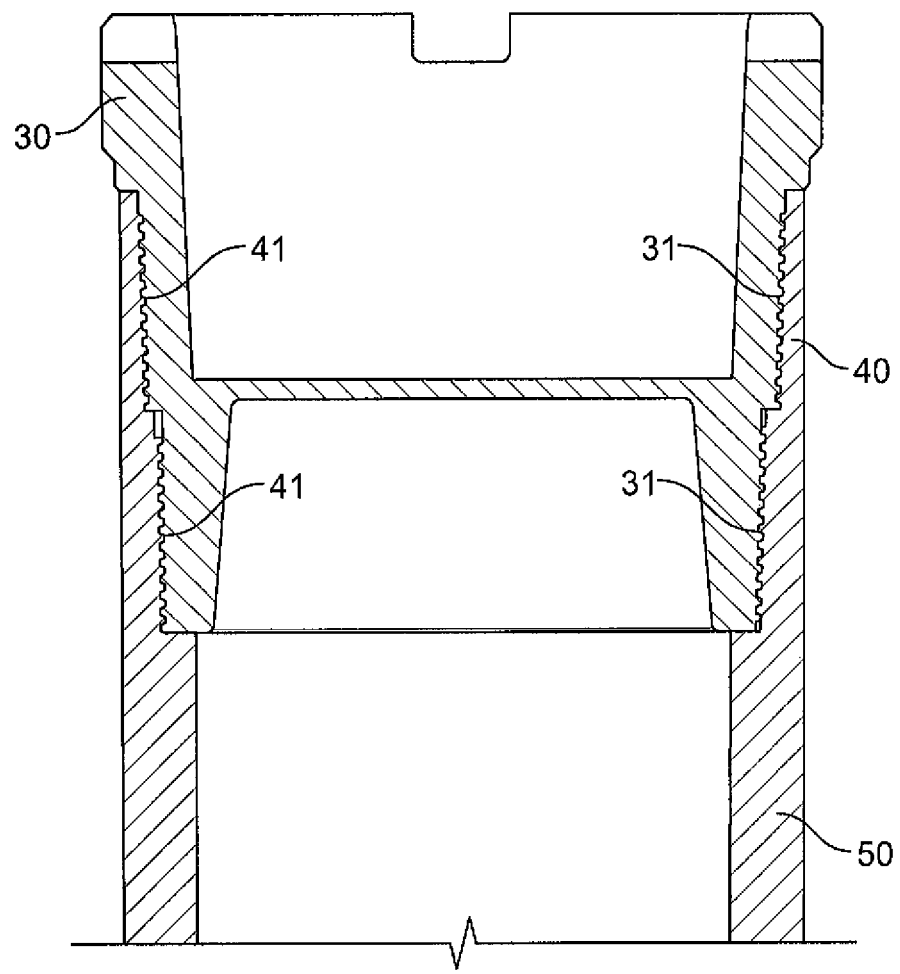
FIG. 1B is a partial cross-sectional view of a conventional box end thread protector.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 7:
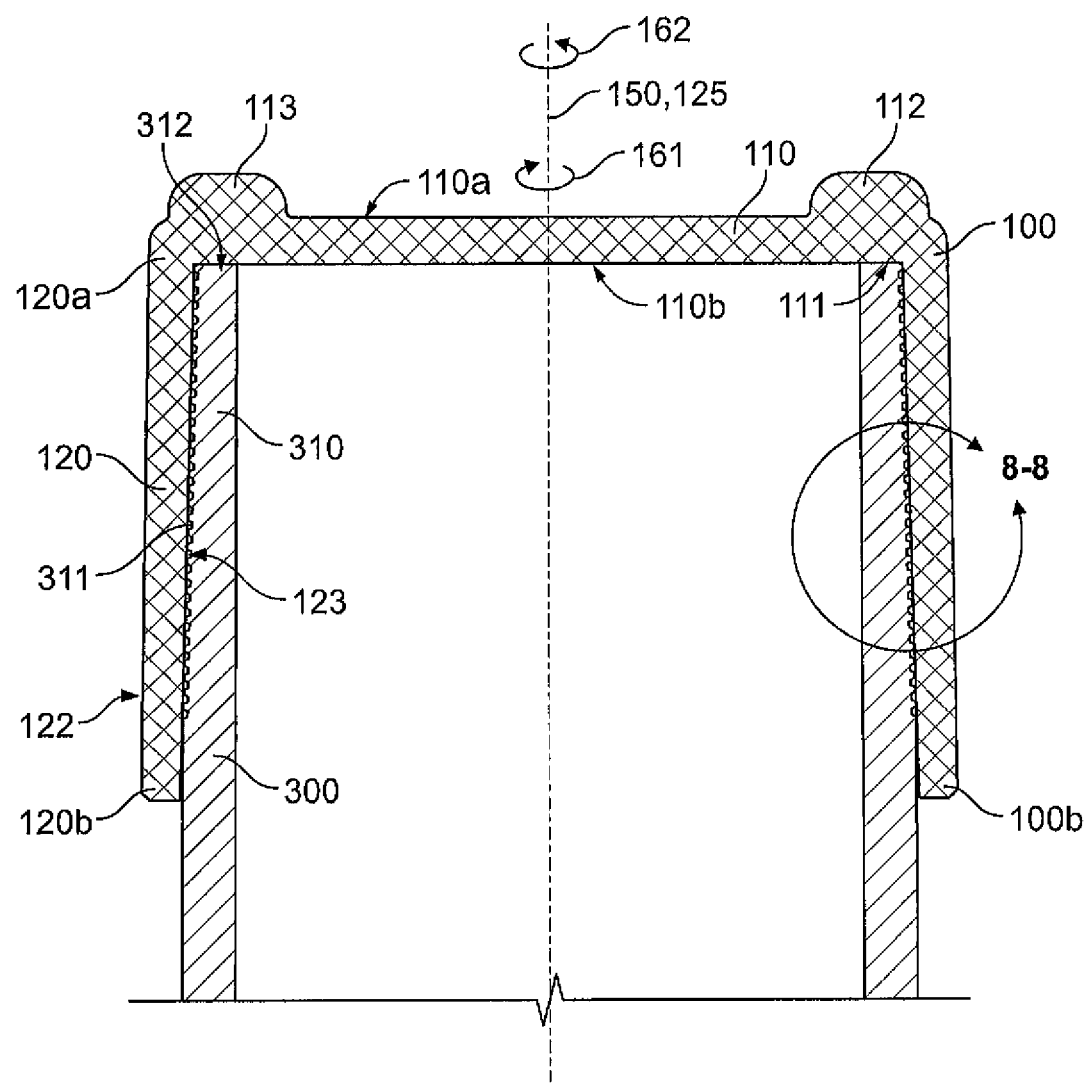
FIG. 7 is a cross-sectional view of the pin end thread protector of FIG. 2 coupled to the pin end of a pipe section.

Referring now to FIGS. 2-5, an embodiment of a pin end thread protector 100 in accordance with the principles described herein is shown. In FIG. 7, thread protector 100 is shown coupled to the pin end 310 of a pipe 300. Once mounted on pin end 310, thread protector 100 protects external threads 311 on pin end 310 from damage (e.g., impacts with other objects, corrosion, etc.).

Thread protector 100 has a central axis 150, a first or closed end 100a, and a second or open end 100b opposite first end 100a. At closed end 100a, thread protector 100 comprises a base 110. During use, the terminal end 312 of box end 310 axially abuts and sealingly engages base 110 (FIG. 7). An annular body or connecting member 120 extends axially from base 110 to second end 100b. As will be described in more detail below, during use connecting member 120 receives pin end 310 of pipe 300 through open end 100b (FIG. 7). Thus, connecting member 120 may also be described as a female "box."

Thread protector 100 has a height $H_{100}$ measured axially between ends 100a, b. Height $H_{100}$ is preferably equal to or greater than the axial length of the threaded portion of pin end 310, such that all external threads 311 are covered and protected by thread protector 100.

Referring still to FIGS. 2-5, in this embodiment, base 110 is generally circular with an outer diameter $D_{110}$. In addition, base 110 has a planar outer surface 110a oriented perpendicular to axis 150, a planar inner surface 110b opposite surface 110a and perpendicular to axis 150, and a thickness $T_{110}$ measured axially between surfaces 110a, b. The radially outer portion of inner surface 110b defines an annular seat 111 for engaging and sealing against the terminal end 312 of box end 310 (FIG. 7).

A plurality of gripping or engagement members 112 extend axially from outer surface 110a of base 110 proximal the radially outer periphery of base 110. In this embodiment, each gripping member 112 comprises an elongate, straight rib 113 having a longitudinal axis 115 oriented perpendicular to central axis 150. In other words, a projection of each axis 115 intersects axis 150. Further, in this embodiment, two gripping members 112, uniformly angularly spaced apart about axis 150, are provided. Gripping members 112 provide a structure and mechanism for positively engaging thread protector 100 and applying rotational torque to thread protector 100 to rotate thread protector 100 about axis 150 during installation on pin end 310 (FIG. 7). Although two gripping members 112 uniformly angularly spaced 180° apart about axis 150 are provided in the embodiment shown in FIGS. 2-5, in general, any suitable number of gripping members (e.g., gripping members 112) may be provided, and further, the gripping members may be uniformly or non-uniformly angularly spaced.

Referring still to FIGS. 2-5, box 120 has a central axis 125 coaxially aligned with axis 150, a first or base end 120a connected to base 110, and a second or free end 120b distal base 110. A central bore 121 extends axially through box 120 between ends 120a, b and is adapted to at least partially receive pin end 310 (FIG. 7). At end 120a, base 110 extends across, closes off, and occludes bore 121. However, at end 120b, bore 121 is open, thereby defining opening 101 of protector 100.

Figure 5:
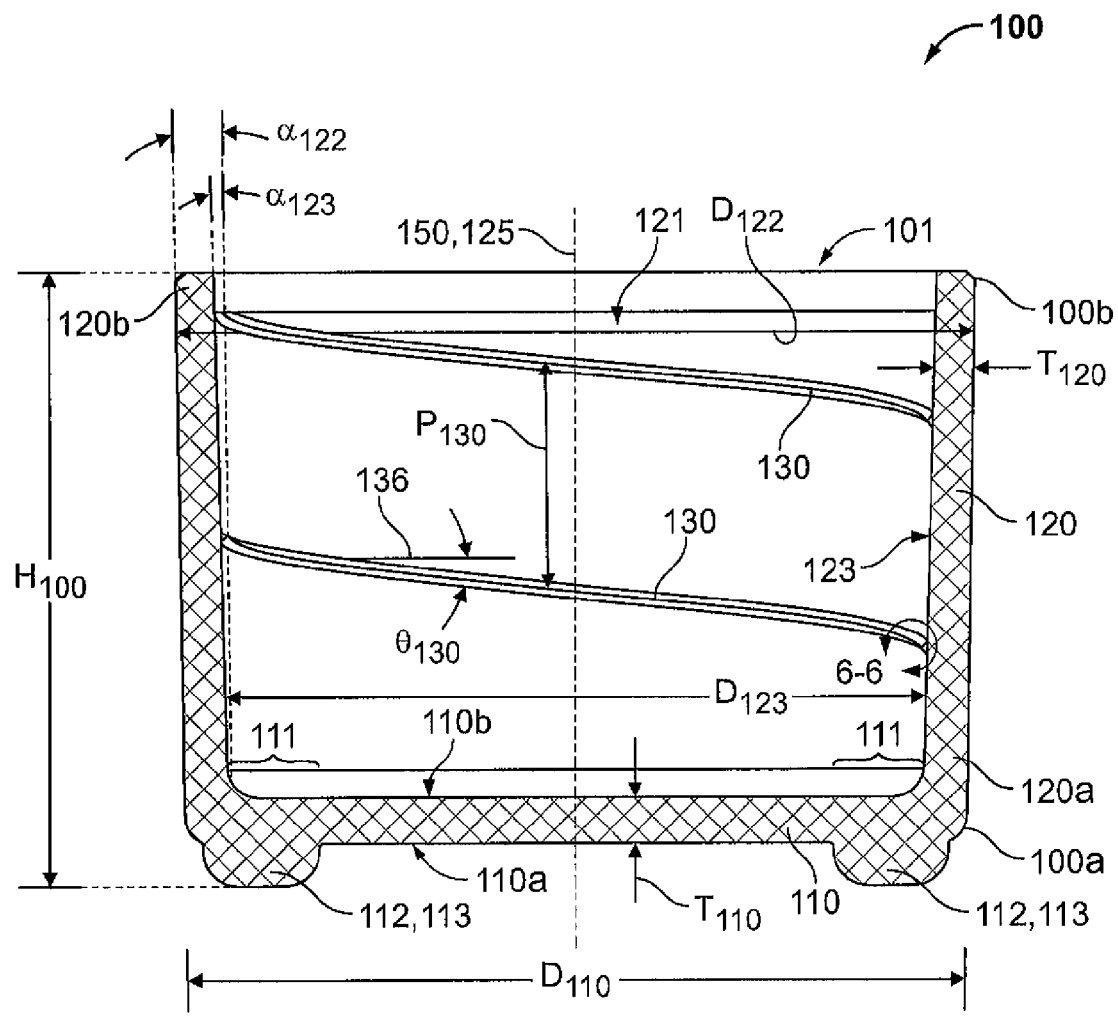
FIG. 5 is a cross-sectional view of the pin end thread protector of FIG. 2.

Box 120 has a radially outer surface 122 defining an outer diameter $D_{122}$ and a radially inner surface 123 defining an inner diameter $D_{123}$. As best shown in FIG. 5, in this embodiment, outer surface 122 is oriented at an acute angle $\alpha_{122}$ relative to box axis 125, and inner surface 123 is oriented at an acute angle $\alpha_{123}$ relative to box axis 125. Thus, surfaces 122, 123 may each be described as being frustoconical. In this embodiment, each surface 122, 123 slopes away from central axis 125 moving axially from end 120a to end 120b. Consequently, each diameter $D_{122}$, $D_{123}$ increases moving axially from end 120a to end 120b. Further, in this embodiment, angle $\alpha_{122}$ is the same as angle $\alpha_{123}$. However, angle $\alpha_{122}$ and angle $\alpha_{123}$ need not be equal. Thus, surfaces 122, 123 are parallel to each other, and the thickness $T_{120}$ of the annular wall forming box 120 (measured radially between surfaces 122, 123) is constant moving axially from end 120a to end 120b.

The pin end of drilling and production pipes (e.g., pin end 310 of pipe 300 shown in FIG. 7) is typically tapered (i.e., the outer diameter of the pin end increases moving away from the terminal end of the pipe). Angle $\alpha_{123}$ is preferably selected such that inner surface 123 is parallel to the tapered radially outer surface of the pin end (e.g., pin end 310) when protector 100 is mounted thereon. For most applications, angle $\alpha_{123}$ is preferably between 0° and 3°, and more preferably between 1° and 2°.

Although surfaces 122, 123 of box 120 have been described as being frustoconical and parallel to each other, in other embodiments, the radially inner and/or radially outer surface of the box (e.g., outer surface 122 and/or inner surface 123 of box 120) may be cylindrical (i.e., have a constant diameter), and further, the radially inner surface may not be parallel to the radially outer surface. Such alternative embodiments may be particularly suited for use with drilling or production pipes that do not have tapered pin ends.

Figure 2:
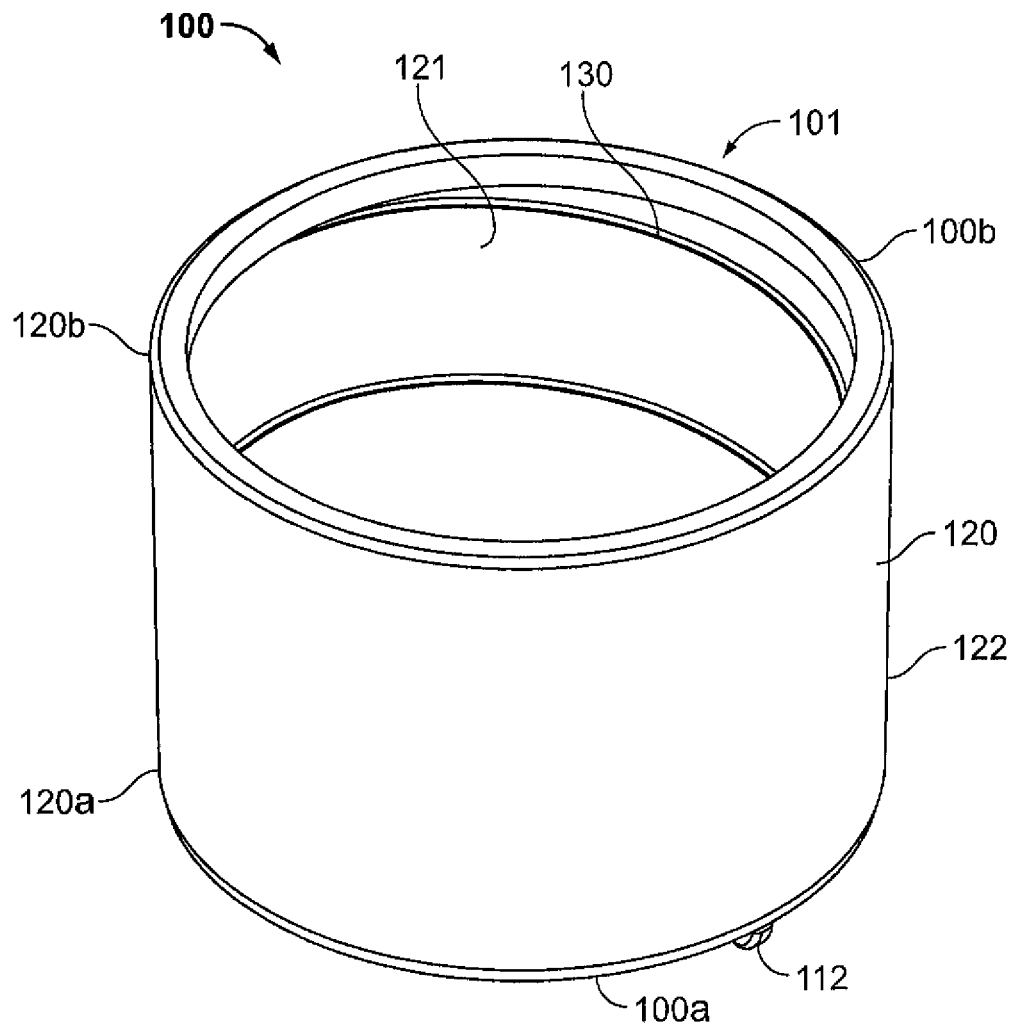
FIG. 2 is a perspective top view of an embodiment of a pin end thread protector in accordance with the principles described herein.
Figure 3:
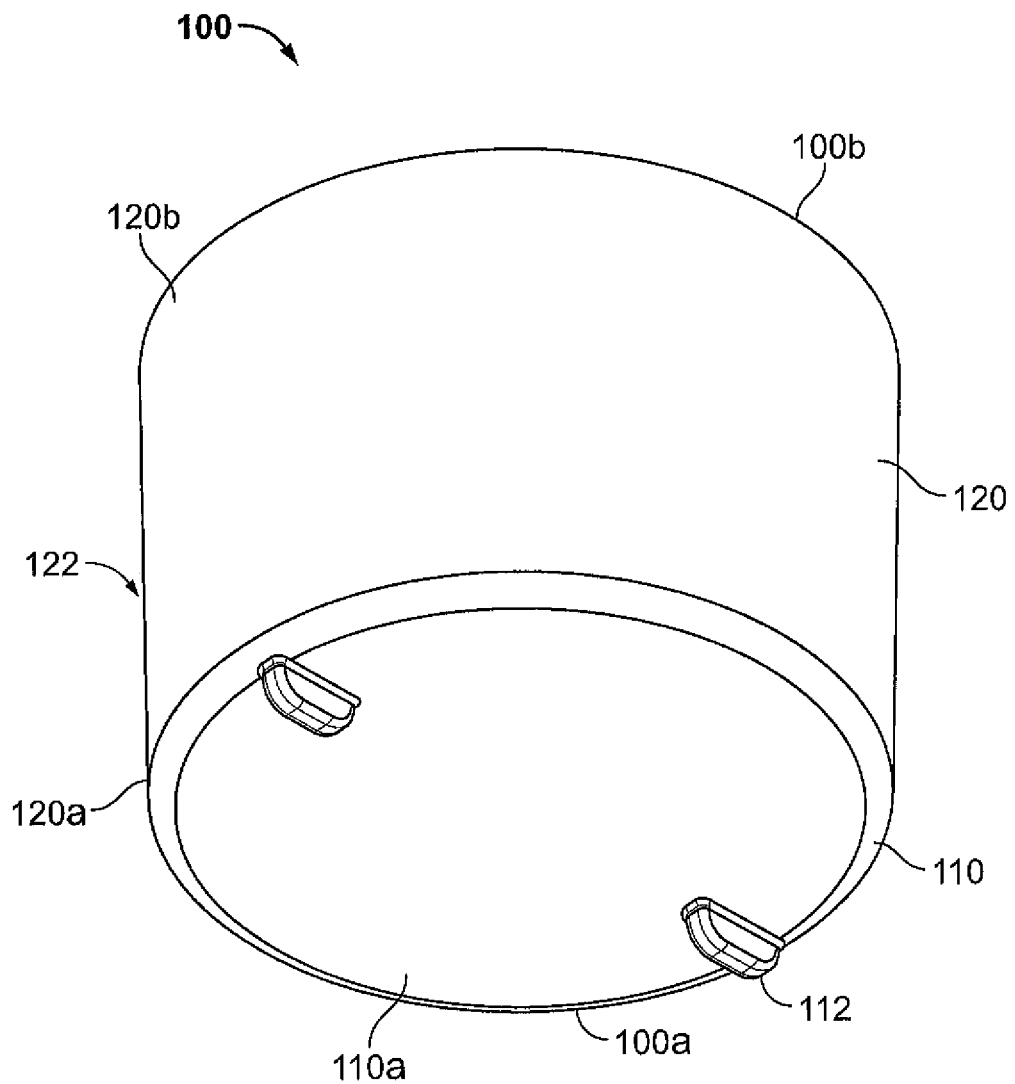
FIG. 3 is a perspective bottom view of the pin end thread protector of FIG. 2.
Figure 4:
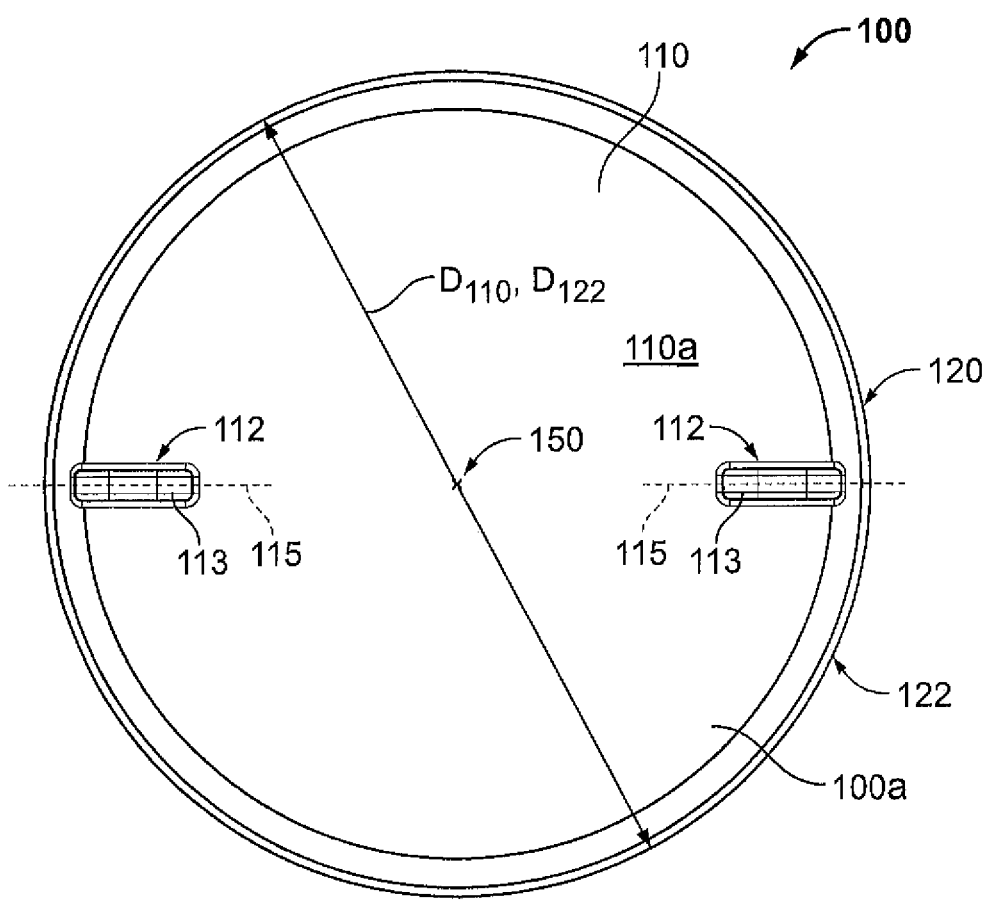
FIG. 4 is a bottom view of the pin end thread protector of FIG. 2.
Figure 6:
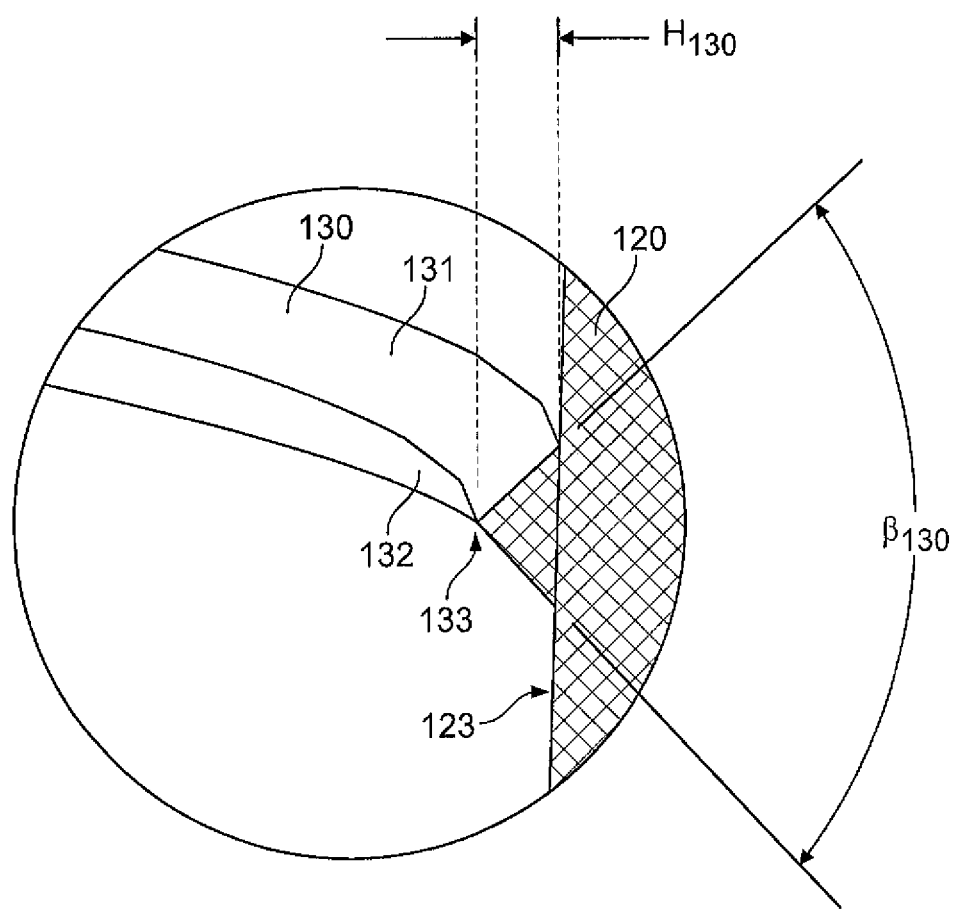
FIG. 6 is an enlarged cross-sectional view of the pin end thread protector of FIG. 2 taken in section 6-6 of FIG. 5.

Referring now to FIGS. 2, 5, and 6, a helical internal thread 130 extends along inner surface 123 of box 120 from open end 120a to closed end 120b. Thread 130 extends about a helical axis that is coincident with axes 125, 150, and has a thread pitch $P_{130}$ equal to the axial width (center-to-center) of one complete turn of thread 130. As compared to the pitch of the internal threads of a similarly sized conventional pin end thread protectors (i.e., sized to fit the same pipe pin end as protector 100), pitch $P_{130}$ of thread 130 is significantly larger. In particular, pitch $P_{130}$ is preferably between 1 in. and 4 in., and more preferably between 1 in. and 2 in. For comparison purposes, most conventional pin end protectors have 5 to 10 internal threads per inch (TPI), and thus, the pitch of the internal threads of most conventional pin end protectors is typically between 0.1 in. (i.e., 5 threads per inch) and 0.2 in. (i.e., 10 threads per inch). Moreover, to ensure mating threaded engagement, the pitch of the internal threads of conventional pin end thread protectors is equal to the pitch of the external threads of the pin end to which the protector is mounted. Thus, pitch $P_{130}$ is greater than the pitch of the internal threads of a similarly sized conventional pin end thread protectors, and is also significantly greater than the pitch of the external threads of the pin end to which protector 100 is mounted (e.g., external threads 311 of pin end 310 shown in FIG. 7).

As best shown in FIG. 5, thread 130 is oriented at a thread angle $\theta_{130}$ relative to a reference plane 136 perpendicular to axis 150. Without being limited by this or any particular theory, thread angle $\theta_{130}$ is a function of inner diameter $D_{123}$ and thread pitch $P_{130}$. In general, for pin end thread protectors (e.g., thread protector 100), the thread angle (e.g., thread angle $\theta_{130}$) is inversely related to the thread protector inner diameter (e.g., inner diameter $D_{123}$), and directly related to the thread pitch (e.g., thread pitch $P_{130}$). In other words, for a particular thread pitch, as thread protector inner diameter increases, thread angle decreases; and for a particular thread protector inner diameter, as thread pitch increase, thread angle increase. Compared to the thread angle of the internal threads of a similarly sized conventional pin end thread protectors, thread angle $\theta_{130}$ of thread 130 is significantly larger. Thread angle $\theta_{130}$ of thread 130 is also significantly larger than the thread angle of the external threads of the pin end to which protector 100 is mounted (e.g., external threads 311 of pin end 310 shown in FIG. 7).

Referring now to FIG. 6, an enlarged partial cross-sectional view of internal thread 130 is shown. In this embodiment, thread 130 has a triangular cross-sectional shape defined by a first or axially upper generally frustoconical surface 131 and a second or axially lower generally frustoconical surface 132 oriented at an angle $\beta_{130}$ relative to surface 131. Surfaces 131, 132 extend radially inward from box inner surface 123 and intersect at an edge 133. In this embodiment, edge 133 is generally sharp and pointed, however, in other embodiments, the intersection between the surfaces of the thread may be rounded and include a radius. Angle $\beta_{130}$ is preferably between 45° and 180°, and more preferably between 60° and 120°. In this embodiment, angle $\beta_{130}$ is 90°. Although thread 130 is shown and described as having a triangular geometry, in general, the internal thread of the box end thread protector (e.g., thread 130 of box end thread protector 100) may have other geometries geometry. For example, the internal thread may have a trapezoidal cross-section, a rectangular cross-section, etc.

Referring still to FIG. 6, internal thread 130 has a thread height $H_{130}$ measured radially inward from inner surface 123 to the radially innermost point of thread 230 (i.e., edge 133). Thread height $H_{130}$ is preferably between 0.015 in. and 0.05 in., and more preferably between 0.020 in. and 0.035 in. In this embodiment, height $H_{130}$ is 0.029 in.

Figure 8:
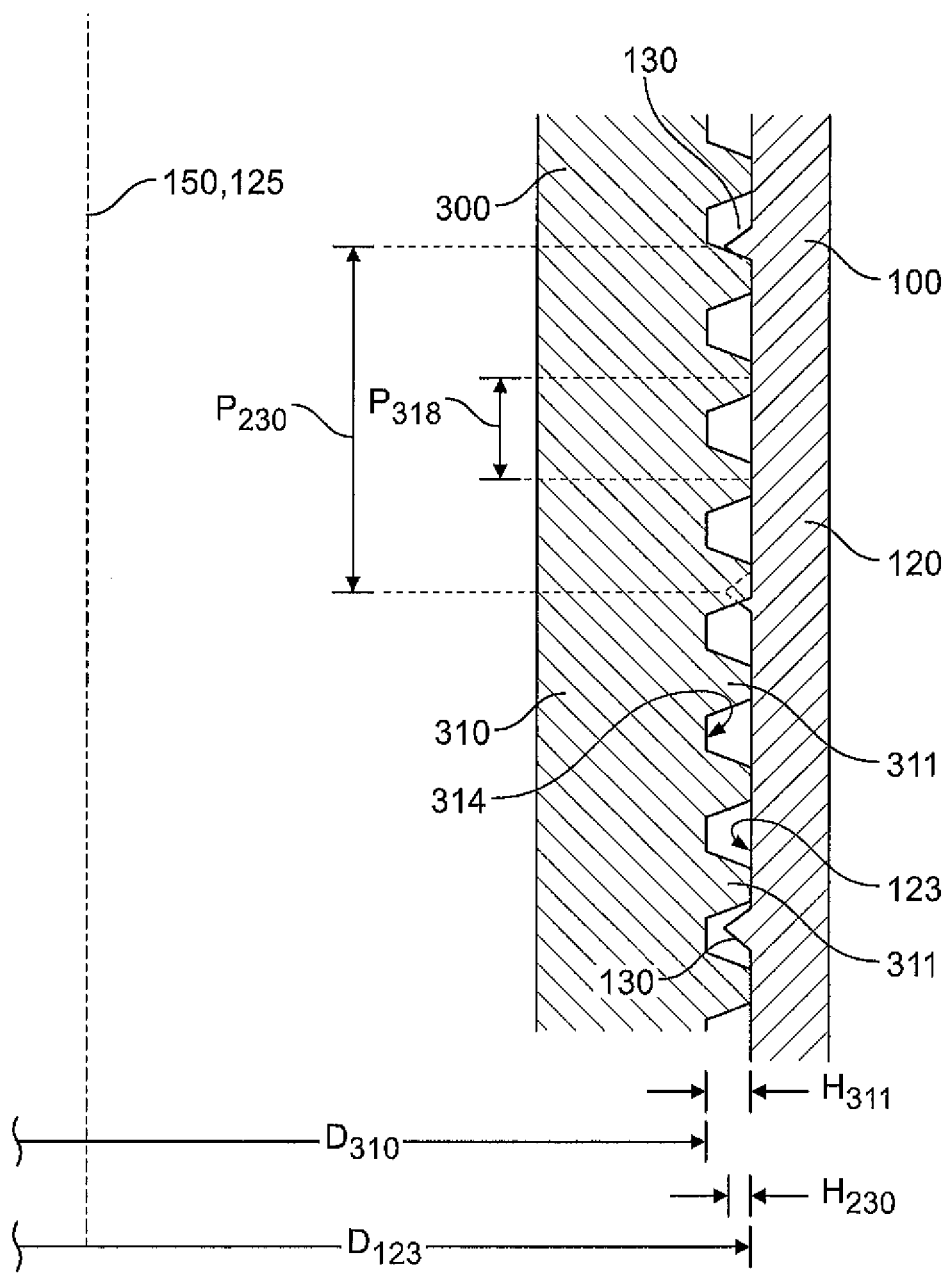
FIG. 8 is an enlarged cross-sectional view of the pin end thread protector of FIG. 2 taken in section 8-8 of FIG. 7.

Referring now to FIGS. 7 and 8, pin end thread protector 100 is shown mounted to the pin end 310 of conventional pipe 300. Pin end 310 has a frustoconical radially outer surface 314 defining a pin end outer diameter $D_{310}$. As is conventional for drilling and production pipes, outer surface 314 tapers inward moving axially towards terminal end 312. Thus, outer diameter $D_{310}$ decreases moving axially towards terminal end 312. Further, an external helical thread 311 begins at terminal end 312 and extends about pin end 310. External thread 311 has a thread height $H_{311}$ measured radially outward from surface 314 to the radially outermost point of thread 311. In this embodiment, thread height $H_{130}$ of protector internal thread 130 is half the thread height $H_{311}$ of pipe external thread 311. In other embodiments, the relative heights $H_{130}$, $H_{311}$ may vary. For example, in other embodiments, thread height $H_{130}$ may be the same as thread height $H_{311}$ of pipe external thread 311.

For a particular application (i.e., a particular pipe 300), protector 100 is preferably sized such that internal thread 130 radially interferes and overlaps with external thread 311 when thread protector 100 is mounted to pin end 310. Accordingly, inner diameter $D_{123}$ of thread protector 100 minus two times internal thread height $H_{130}$ is preferably less than outer diameter $D_{310}$ plus two times external thread height $H_{311}$ at any given axial distance from terminal end 312. However, inner thread protector surface 123 preferably does not radially interfere or overlap with external thread 311, and outer pin end surface 314 preferably does not radially overlap or interfere with internal thread 130. Accordingly, inner diameter $D_{123}$ is preferably the same or slightly greater than outer diameter $D_{310}$ plus two times external thread height $H_{311}$ at any given axial distance from terminal end 312, and outer pin end diameter $D_{310}$ is preferably the same or slightly less than inner diameter $D_{123}$ minus two times internal thread height $H_{130}$, at any given axial distance from terminal end 312. For a thread height $H_{130}$ that is constant along internal thread 130, and a thread height $H_{311}$ that is constant along external thread 311, angle $\alpha_{123}$ of inner surface 123 relative to axis 125 is preferably selected such the slope of inner surface 123 relative to axis 125 matches the taper of pin end 310 (i.e., inner surface 123 is parallel to outer surface 314 of pin end 310).

As best shown in FIG. 8, external threads 311 have a thread pitch $P_{311}$ equal to the axial (center-to center) width of one complete turn of thread 311. The pin end of conventional pipes (e.g., pipe 300) typically has 5 to 10 external threads per inch, and thus, has a thread pitch between 0.1 in. (i.e., 5 threads per inch) and 0.2 in. Thread pitch $P_{311}$ of external thread 311 on pin end 310 is less than thread pitch $P_{130}$ of internal thread 130 of thread protector 100.

To mount thread protector 100 to pin end 310, terminal end 312 is axially inserted into opening 101 and axially advanced until external thread 311 at terminal end 312 abuts internal thread 130. Next, rotational torque is applied to thread protector 100 via gripping members 112 to rotate thread protector 100 about axis 150 relative to pipe 300 in the direction of arrow 161. Simultaneous with the rotation of thread protector 100, pin end 310 is axially urged through opening 101 and into bore 121.

As previously described, thread pitch $P_{130}$ of internal thread 130 is not the same as thread pitch $P_{311}$ of external thread 311. Thus, unlike conventional pin end thread protector internal threads, which mate with the pin end external threads, threads 130, 311 do not mate. Rather, threads 130, 311 are intentionally designed to cross-thread. To ensure thread 311 on pin end 310 is not damaged, thread 130 is preferably made from a material that is softer (i.e., not as hard) as threads 311. Accordingly, while cross-threading threads 130, 311, external thread 311 cuts across internal thread 130, but internal thread 130 does not cut across or otherwise damage external thread 311 of pin end 310. The portions of thread 130 that have been cross-threaded and cut by thread 311 are represented with dashed lines in FIG. 8. Drilling and production pipes (e.g., pipe 300) are typically made of steel. Thus, for such applications, the internal threads of the thread protector (e.g., threads 130) are preferably made from a material that is softer than steel such as the preferred materials previously described for thread protector 100.

Pin end thread protector 100 is preferably cross-threaded onto pin end 310 until terminal end 312 axial abuts and sealingly engages annular seat 111 of base 110. The cross-threaded engagement of threads 130, 311 provides sufficient resistant to axial forces that may otherwise pull thread protector 100 off of pin end 310, thereby maintaining the mounted position of thread protector 100 on pin end 310. Further, the cross-threaded engagement of threads 130, 311 restricts and/or prevents the ingress of water and other corrosive fluids from passing axially between threads 130, 311. To remove thread protector 100 from pin end 310, rotational torque is applied to thread protector 100 via gripping members 112 to rotate thread protector 100 about axis 150 relative to pipe 300 in the direction of arrow 162. Simultaneous with the rotation of thread protector 100, pin end 310 is axially pulled from bore 121 through opening 101.

Pin end thread protector 100 is designed for repeated use. However, since internal thread 130 is cross-threaded and cut by the external thread of the pin end (e.g., thread 311) during each application, thread 130 may eventually become sufficiently damaged that continued use is undesirable. In particular, thread 130 may be cross-threaded and cut a sufficient number of times that it is incapable of (a) resisting the application of axial forces tending to separate thread protector 100 from the pin end, and/or (b) sufficiently sealing with the pin end external thread to restrict and/or prevent the ingress of water or other corrosive fluids between thread protector 100 and the pin end to which it is mounted. It is believe that embodiments described herein may be used a minimum of four to six times before these detrimental consequences of cross-threading arise.

Pin end thread protector 100 is designed for use with a particular diameter pin end (e.g., pin end 310). However, unlike conventional thread protectors designed for use with a specific thread form and pitch, pin end thread protector 100 may be used with virtually any thread form and any thread pitch. Accordingly, embodiments of pin end thread protector 100 offer the potential for a more versatile thread protector capable of being used with similarly sized pipes having different thread forms and thread pitches. As a result, embodiments of pin end thread protector 100 also offer the potential to reduce thread protector inventory and storage requirements by reducing the number of different thread protectors that must be manufactured and stored to account for all the possible combinations of pin end diameter, thread form, and thread pitch.

Figure 14:
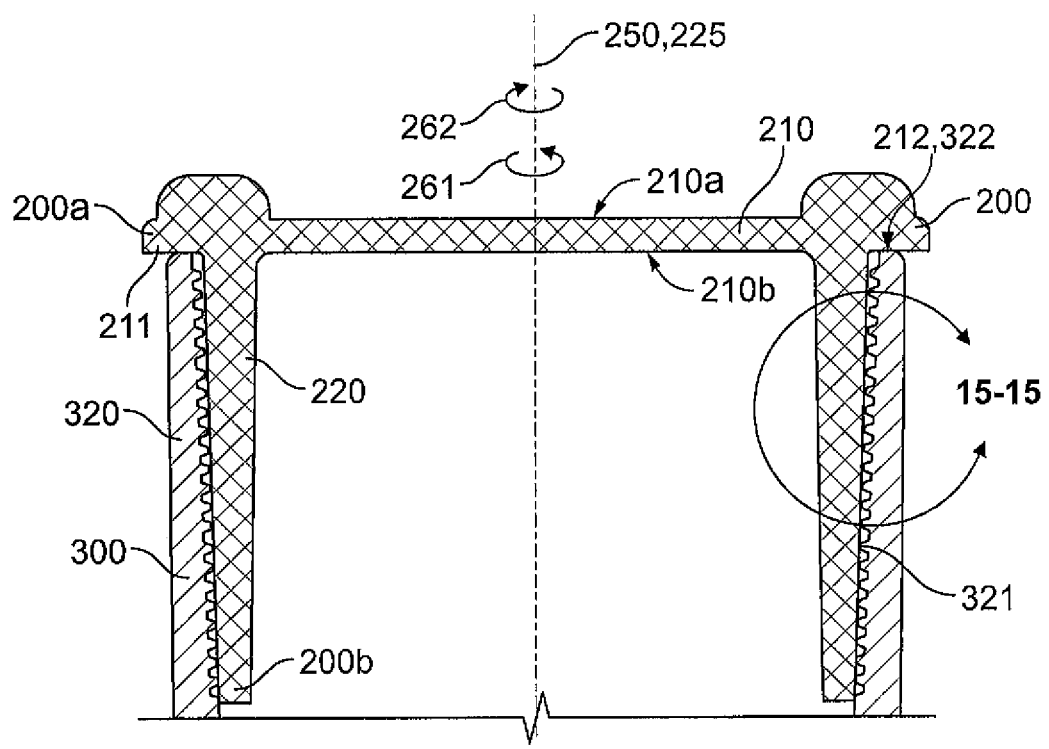
FIG. 14 is a cross-sectional view of the box end thread protector of FIG. 9 coupled to the box end of a pipe section.

Referring now to FIGS. 9-12, an embodiment of a box end thread protector 200 in accordance with the principles described herein is shown. In FIG. 14, thread protector 200 is shown coupled to the box end 320 of pipe 300. Once mounted to box end 320, thread protector 200 protects internal threads 321 in box end 300 from damage (e.g., impacts with other objects, corrosion, etc.).

Thread protector 200 has a central axis 250, a first or closed end 200a, and a second or open end 200b opposite first end 200a. At closed end 200a, thread protector 200 comprises a base 210. During use, base 210 axially abuts and sealingly engages terminal end 322 of box end 320. An annular body or connecting member 220 extends axially from base 210 to second end 200b. As will be described in more detail below, during use, connecting member 220 extends axially into box end 320 box end 320 of pipe 300 (FIG. 7). Thus, connecting member 220 may also be described as a male "pin."

Thread protector 200 has a height $H_{200}$ measured axially between ends 200a, b. Height $H_{200}$ is preferably equal to or greater than the axial length of the threaded portion of box end 320, such that all internal threads 321 are covered and protected by thread protector 200.

Referring still to FIGS. 9-12, in this embodiment, base 210 is generally circular with an outer diameter $D_{210}$. In addition, base 210 has a planar outer surface 210a oriented perpendicular to axis 250, a planar inner surface 210b oriented perpendicular to axis 250, and a thickness $T_{210}$ measured axially between surfaces 210a, b. Base 210 extends radially beyond pin 220, thereby defining an annular flange 211 extending about pin 220. Along flange 211, planar surface 210b forms an annular seat 212 for engaging and sealing against the terminal end 322 of box end 320 (FIG. 14).

A plurality of gripping or engagement members 213 extend axially from outer surface 210a of base 210 proximal the radially outer periphery of base 210. In this embodiment, each gripping member 213 is the same as gripping members 112 previously described. Namely, each gripping member 213 comprises an elongate, straight rib 214 having a longitudinal axis 215 oriented perpendicular to central axis 250. In particular, a projection of each axis 215 intersects axis 250. Further, in this embodiment, two gripping members 213, uniformly angularly spaced apart about axis 250, are provided. Gripping members 213 provide a structure and mechanism for positively engaging thread protector 200 and applying rotational torque to thread protector 200 to rotate thread protector 200 about axis 250 during installation on box end 320 (FIG. 14). Although two gripping members 213 uniformly angularly spaced 180° apart about axis 250 are provided in the embodiment shown in FIGS. 9-12, in general, any suitable number of gripping members (e.g., gripping members 213) may be provided, and further, the gripping members may be uniformly or non-uniformly angularly spaced.

Referring still to FIGS. 9-12, pin 220 has a central axis 225 coaxially aligned with axis 250, a first or base end 220a connected to base 210, and a second or free end 220b distal base 210. A central bore 221 extends axially through pin 220 between ends 220a, b. At end 220a, base 210 extends across, closes off, and occludes bore 221. However, in this embodiment, bore 121 is open at end 220b. In other embodiments, both ends of the box end thread protector (e.g., ends 220a, b of thread protector 200) may be closed off and occluded. Specifically, since pin 220 is disposed inside box end 320 of pipe 300, and bore 221 is not configured to receive any portion of pipe 300, end 220a may be open or closed.

Figure 12:
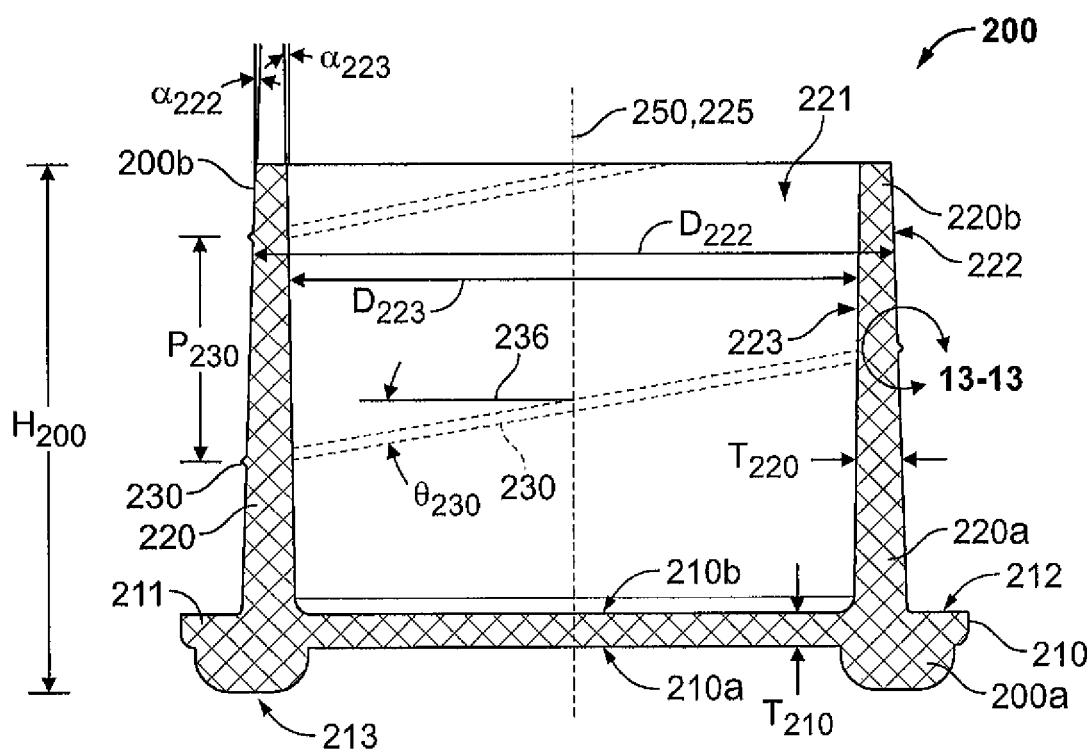
FIG. 12 is a cross-sectional view of the pin end thread protector of FIG. 9.

Pin 220 has a radially outer surface 222 defining an outer diameter $D_{222}$ and a radially inner surface 223 defining an inner diameter $D_{223}$. As best shown in FIG. 12, in this embodiment, outer surface 222 is oriented at an acute angle $\alpha_{222}$ relative to pin axis 225, and inner surface 223 is oriented at an acute angle $\alpha_{223}$ relative to pin axis 225. Thus, surfaces 222, 223 may each be described as being frustoconical. In this embodiment, inner surface 223 slopes away from pin axis 225 moving axially from end 220a to end 220b, while outer surface 222 slopes towards inner surface 223 and pin axis 225 moving axially from end 220a to end 220b. Consequently, diameter $D_{222}$ decreases moving axially from end 120a to end 120b, while diameter $D_{123}$ increases moving axially from end 120a to end 120b. However, in this embodiment, surfaces 222, 223 are not parallel to each other, and further, the thickness $T_{220}$ of the annular wall forming pin 220 (measured radially between surfaces 222, 223) decreases moving axially from end 120a to end 120b.

The receiving bore of the box end of most drilling and production pipes (e.g., box end 320 of pipe 300 shown in FIG. 14) is slightly tapered. Angle $\alpha_{222}$ is preferably selected such that outer surface 222 is parallel to the tapered bore of the box end (e.g., box end 320) when protector 200 is mounted to pipe 300. For most applications, angle $\alpha_{222}$ is preferably between 0° and 3°, and more preferably between 1° and 2°.

Figure 9:
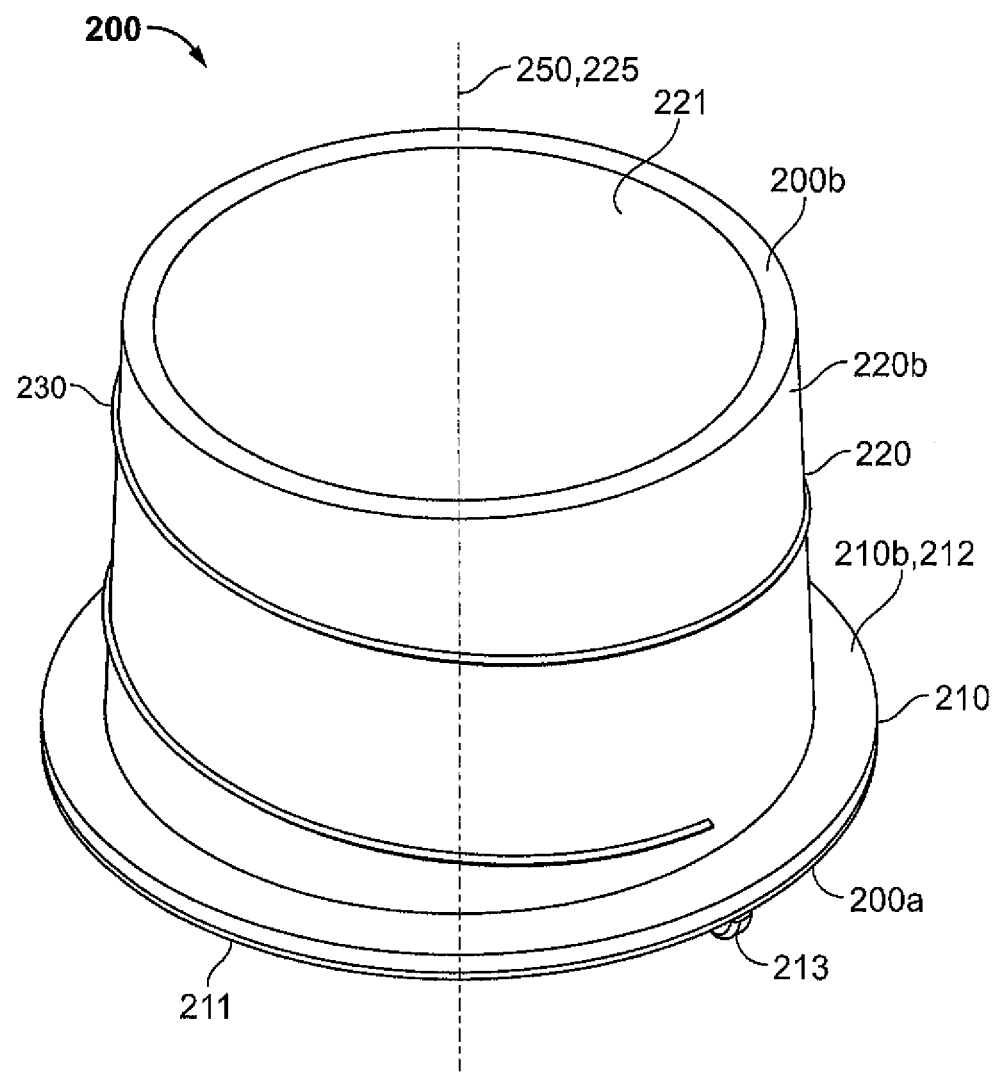
FIG. 9 is a perspective top view of an embodiment of a box end thread protector in accordance with the principles described herein.
Figure 10:
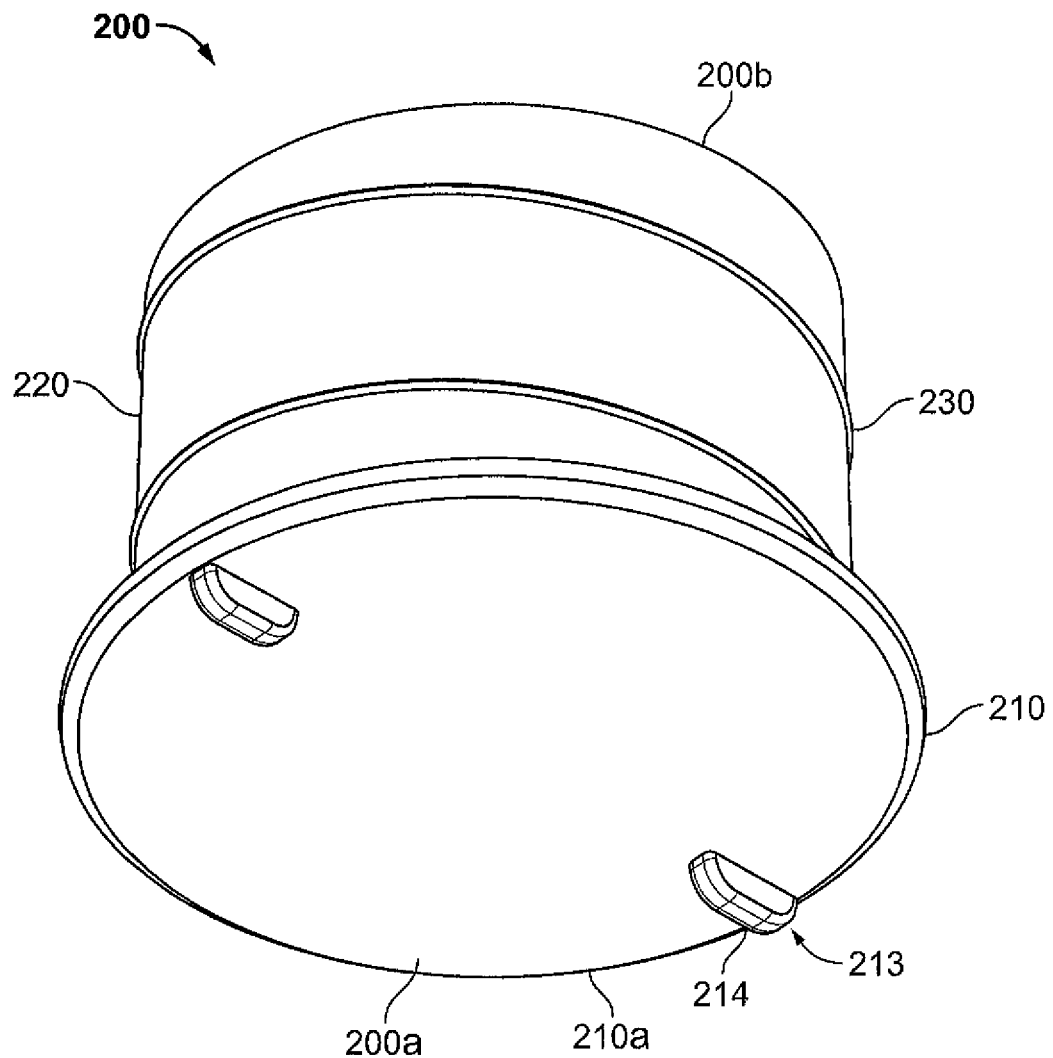
FIG. 10 is a perspective bottom view of the pin end thread protector of FIG. 9.
Figure 11:
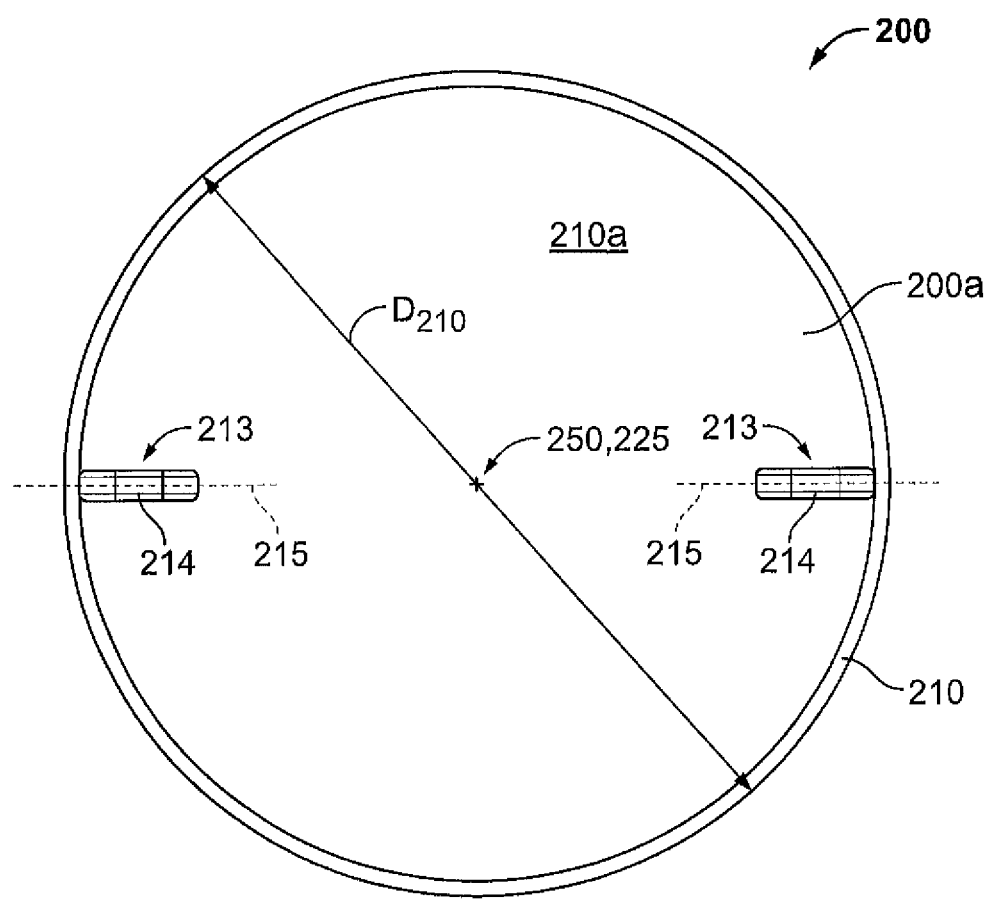
FIG. 11 is a bottom view of the pin end thread protector of FIG. 9.
Figure 13:
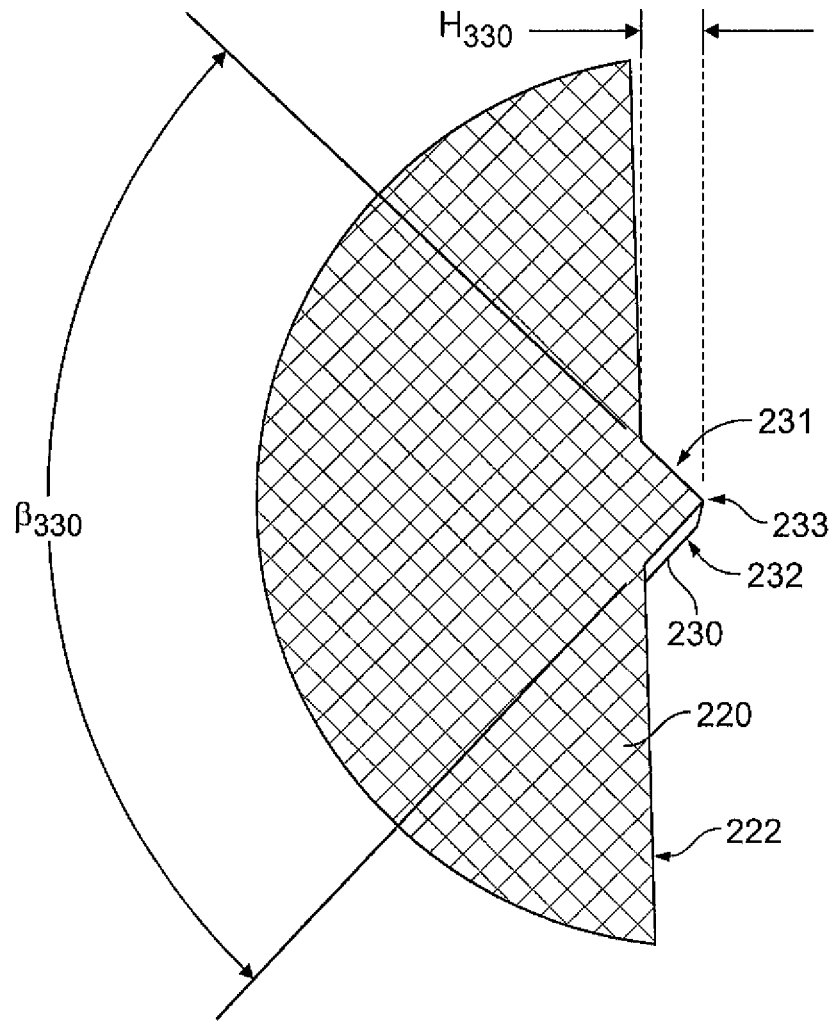
FIG. 13 is an enlarged cross-sectional view of the pin end thread protector of FIG. 9 taken in section 13-13 of FIG. 12.

Referring now to FIGS. 9, 12, and 13, a helical external thread 230 extends along outer surface 223 of pin 220 from end 220b to end 220a. Thread 230 extends about a helical axis that is coincident with axes 225, 250, and has a thread pitch $P_{230}$ equal to the axial width (center-to-center) of one complete turn of thread 230. As compared to the pitch of the external threads of a similarly sized conventional box end thread protectors (i.e., sized to fit the same box end as protector 200), pitch $P_{330}$ of thread 130 is significantly larger. In particular, pitch $P_{230}$ is preferably between 1 in. and 4 in., and more preferably between 1 in. and 2 in. For comparison purposes, most conventional box end protectors have 5 to 10 external threads per inch, and thus, the pitch of the external threads of most conventional box end protectors is typically 0.1 in. (i.e., 5 threads per inch) and 0.2 in. (i.e., 10 threads per inch). Moreover, to ensure mating threaded engagement, the external threads of conventional box end protectors have a pitch equal to the pitch of the internal threads of the box end to which the protector is mounted. Since pitch $P_{230}$ is greater than the pitch of the external threads of a similarly sized conventional box end thread protectors, pitch $P_{230}$ is also significantly greater than the pitch of the internal threads of the box end to which protector 200 is mounted (e.g., internal threads 321 of box end 320 shown in FIG. 14).

As best shown in FIG. 12, thread 230 is oriented at a thread angle $\theta_{230}$ relative to a reference plane 236 perpendicular to axis 250. Without being limited by this or any particular theory, thread angle $\theta_{230}$ is a function of outer diameter $D_{222}$ and thread pitch $P_{230}$. In general, for box end thread protectors (e.g., thread protector 200), the thread angle (e.g., thread angle $\theta_{230}$) is inversely related to the thread protector outer diameter (e.g., inner diameter $D_{222}$), and directly related to the thread pitch (e.g., thread pitch $P_{230}$). In other words, for a particular thread pitch, as thread protector inner diameter increases, thread angle decreases; and for a particular thread protector inner diameter, as thread pitch increase, thread angle increase. Compared to the thread angle of the external threads of a similarly sized conventional box end thread protectors, thread angle $\theta_{230}$ of thread 230 is significantly larger.

Referring now to FIG. 13, an enlarged partial cross-sectional view of external thread 230 is shown. In this embodiment, thread 230 has a triangular cross-sectional shape defined by a first or axially upper generally frustoconical surface 231 and a second or axially lower generally frustoconical surface 232 oriented at an angle $\beta_{230}$ relative to surface 231. Surfaces 231, 232 extend radially outward from box outer surface 222 and meet at an edge 233. In this embodiment, edge 233 is generally sharp and pointed, however, in other embodiments, the intersection between the surfaces of the thread may be rounded and include a radius. Angle $\beta_{230}$ is preferably between 45° and 180°, and more preferably between 60° and 120°. In this embodiment, angle θ is 90°. Although thread 230 is shown and described as having a triangular geometry, in general, the external thread of the box end thread protector (e.g., thread 230 of box end thread protector 200) may have other geometries. For example, the external thread may have a trapezoidal cross-section, a rectangular cross-section, etc.

Referring still to FIG. 13, external thread 230 has a thread height $H_{230}$ measured radially outward from outer surface 222 to the radially outermost point of thread 230. Thread height $H_{230}$ is preferably between 0.015 in. and 0.05 in., and more preferably between 0.020 in. and 0.035 in. In this embodiment, height $H_{230}$ is 0.025 in.

Figure 15:
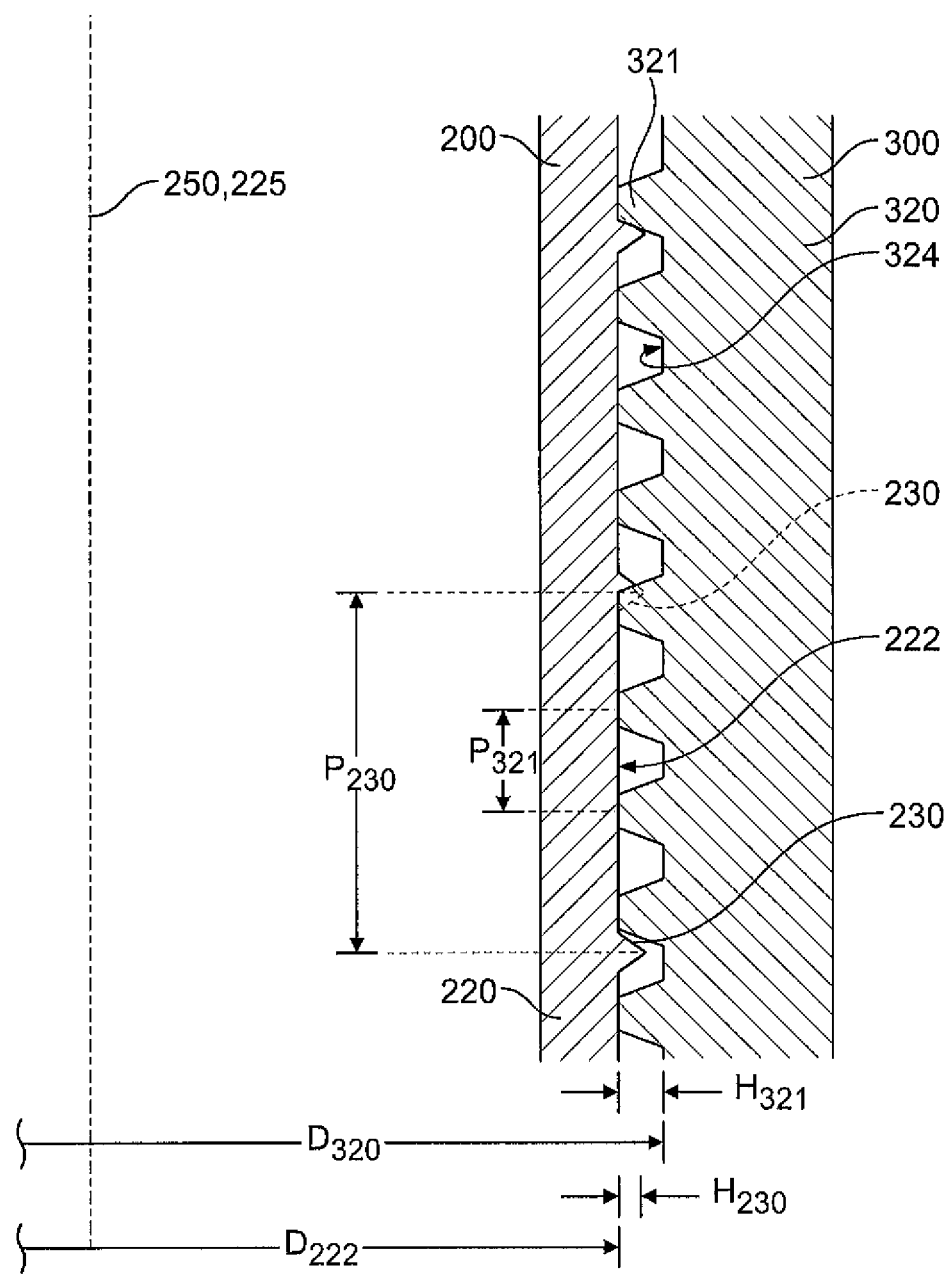
FIG. 15 is an enlarged cross-sectional view of the box end thread protector of FIG. 9 taken in section 15-15 of FIG. 14.

Referring now to FIGS. 14 and 15, box end thread protector 200 is shown mounted to the box end 320 of conventional pipe 300. Box end 320 has a frustoconical radially inner surface 324 defining an inner diameter $D_{320}$. As is conventional for drilling and production pipes, inner diameter $D_{320}$ decreases moving axially away from terminal end 322. Further, an internal helical thread 321 begins at terminal end 322 and extends along inner surface 324 of box end 320. Internal thread 321 has a thread height $H_{321}$ measured radially inward from surface 324 to the radially innermost point on thread 321. In this embodiment, thread height $H_{230}$ of protector external thread 230 is half the thread height $H_{321}$ of pipe internal thread 321. In other embodiments, the relative heights $H_{230}$, $H_{321}$ may vary. For example, in other embodiments, thread height $H_{230}$ may be the same as thread height $H_{321}$ of pipe internal thread 321.

For a particular application (i.e., a particular pipe 300), protector 200 is preferably sized such that external thread 230 radially interferes and overlaps with internal thread 321 when pin 220 is disposed within box end 320. Accordingly, outer diameter $D_{222}$ of pin 220 plus two times external thread height $H_{230}$ is preferably greater than inner diameter $D_{320}$ minus two times internal thread height $H_{321}$ at any given axial distance from terminal end 322. However, outer pin surface 222 preferably does not radially interfere or overlap with internal thread 321, and inner box end surface 324 preferably does not radially overlap or interfere with external thread 230. Accordingly, outer diameter $D_{222}$ is preferably the same or slightly less than inner diameter $D_{320}$ minus two times internal thread height $H_{321}$ at any given axial distance from terminal end 322, and inner diameter $D_{320}$ is preferably the same or slightly greater than outer diameter $D_{222}$ plus two times external thread height $H_{230}$, at any given axial distance from terminal end 332. For a thread height $H_{230}$ that is constant along external thread 230, and a thread height $H_{321}$ that is constant along internal thread 311, angle $\alpha_{222}$ of outer surface 222 is preferably selected such the slope of outer surface 222 matches the slope of inner surface 324 (i.e., outer surface 222 is parallel to the inner surface 324 of box end 320).

As best shown in FIG. 15, internal thread 321 has a thread pitch $P_{321}$ equal to the axial width (center-to-center) of one complete turn of thread 321. The internal threads on the box end of conventional pipes (e.g., internal thread 321 of box end 320) typically have a thread pitch between 0.1 in. (i.e., 10 internal threads per inch) and 0.2 in. (5 internal threads per inch). Thread pitch $P_{321}$ of internal threads 321 on box end 310 is less than thread pitch $P_{230}$ of external threads 230 of thread protector 200.

To mount thread protector 200 to box end 320, end 200b is axially inserted into box end 320 and axially advanced until external thread 230 at end 220b abuts internal thread 321. Next, rotational torque is applied to thread protector 200 via gripping members 213 to rotate thread protector 200 about axis 250 relative to pipe 300 in the direction of arrow 261. Simultaneous with the rotation of thread protector 200, box end 320 is axially urged into box end 320.

As previously described, thread pitch $P_{230}$ of external thread 230 is not the same as thread pitch $P_{321}$ of internal thread 321. Thus, unlike conventional box end thread protector external threads, which mate with the box end internal threads, threads 230, 321 do not mate. Rather, threads 230, 321 are intentionally designed to cross-thread. To ensure threads 321 on box end 320 are not damaged, threads 230 are preferably made from a material that is softer (i.e., not as hard) as threads 321. Accordingly, while cross-threading threads 230, 321, internal thread 321 cuts across external thread 230, but external thread 230 does not cut across or otherwise damage internal threads 321 of box end 320. The portions of thread 230 that have been cross-threaded and cut by thread 321 are represented with dashed lines in FIG. 15. Drilling and production pipes (e.g., pipe 300) are typically made of steel. Thus, for such applications, the internal threads of the thread protector (e.g., threads 230) are preferably made from a material that is softer than steel such as the preferred materials described below for thread protector 200.

Pin end thread protector 200 is preferably cross-threaded into box end 320 until terminal end 322 axial abuts and sealingly engages annular seat 212 of flange 211. The cross-threaded engagement of threads 230, 321 provides sufficient resistant to axial forces that may otherwise pull thread protector 200 from box end 320, thereby maintaining the position of thread protector 200 in box end 320. Further, the sealing engagement of seat 212 and terminal end 322 restricts and/or prevents the ingress of water and other corrosive fluids from passing axially between threads 230, 321. To remove thread protector 200 from box end 320, rotational torque is applied to thread protector 200 via gripping members 213 to rotate thread protector 200 about axis 150 relative to pipe 300 in the direction of arrow 262. Simultaneous with the rotation of thread protector 200, box end 320 is axially pulled from thread protector 200.

Pin end thread protector 200 is designed for repeated use. However, since external thread 230 is cross-threaded and cut by the internal thread 321 during each application, thread 230 may eventually become sufficiently damaged that continued use is undesirable. In particular, thread 230 may be cross-threaded and cut a sufficient number of times that it is incapable of (a) resisting the application of axial forces tending to separate thread protector 200 from the pin end, and/or (b) maintaining sufficient engagement between flange 211 and terminal end 321 to restrict and/or prevent the ingress of water or other corrosive fluids between thread protector 200 and the box end 320. It is believe that embodiments described herein may be used a minimum of four to six times before these detrimental consequences of cross-threading arise.

Pin end thread protector 200 is designed for use with a particular diameter box end (e.g., box end 320). However, unlike conventional thread protectors designed for use with a specific thread form and pitch, box end thread protector 200 may be used with virtually any thread form and thread pitch. Accordingly, embodiments of box end thread protector 200 offer the potential for a more versatile thread protector capable of being used with similarly sized pipes having different thread forms and thread pitches. As a result, embodiments of box end thread protector 200 also offer the potential to reduce thread protector inventory and storage requirements by reducing the number of different thread protectors that must be manufactured and stored to account for all the possible combinations of pin end diameter, thread form, and thread pitch.

The embodiment of pin end thread protector 100 shown in FIGS. 2-5 is a unitary, single-piece structure. In particular, base 110, including gripping members 112, and box 120 are cast, molded, or otherwise formed together as a single piece. Thus, base 110 and box 120 are monolithic. In other embodiments, two or more sections of the pin end thread protector (e.g., base 110, box 120, gripping members 212, etc.) may be formed as separate pieces that are then attached to each other.

Similar to pin end thread protector 100, the embodiment of box end thread protector 200 shown in FIGS. 9-12 is a unitary, single-piece structure. In particular, base 210, including gripping members 213, and pin 220 are cast, molded, or otherwise formed as a single piece. Thus, base 210 and pin 220 are monolithic. In other embodiments, two or more sections of the box end thread protector (e.g., base 210, pin 220, gripping members 213, etc.) may be formed as separate pieces that are then attached to each other.

Pin end thread protector 100 and box end thread protector 200 are each preferably constructed of a durable, corrosion resistant material that plastically deforms under impact so that the impact energy is transformed into internal friction and thermal energy; the thread protectors 100, 200 thus using up or substantially reducing the transmitted energy and preventing the energy from reaching or damaging the threads of the attached pipe 300. Each thread protector 100, 200 is thus preferably constructed of a material that will absorb substantial energy when subjected to external forces, such as the impact energy. The material absorbs the impact energy by deflecting, deforming or flexing and/or yielding or failing, each of these requiring energy. Examples of suitable materials for embodiments of thread protectors described herein (e.g., thread protectors 100, 200) include, without limitation, high density polyethylene materials (e.g., Phillips 66 Marlex® HHM 5502 BN or HXM 50100).

Figure 16:
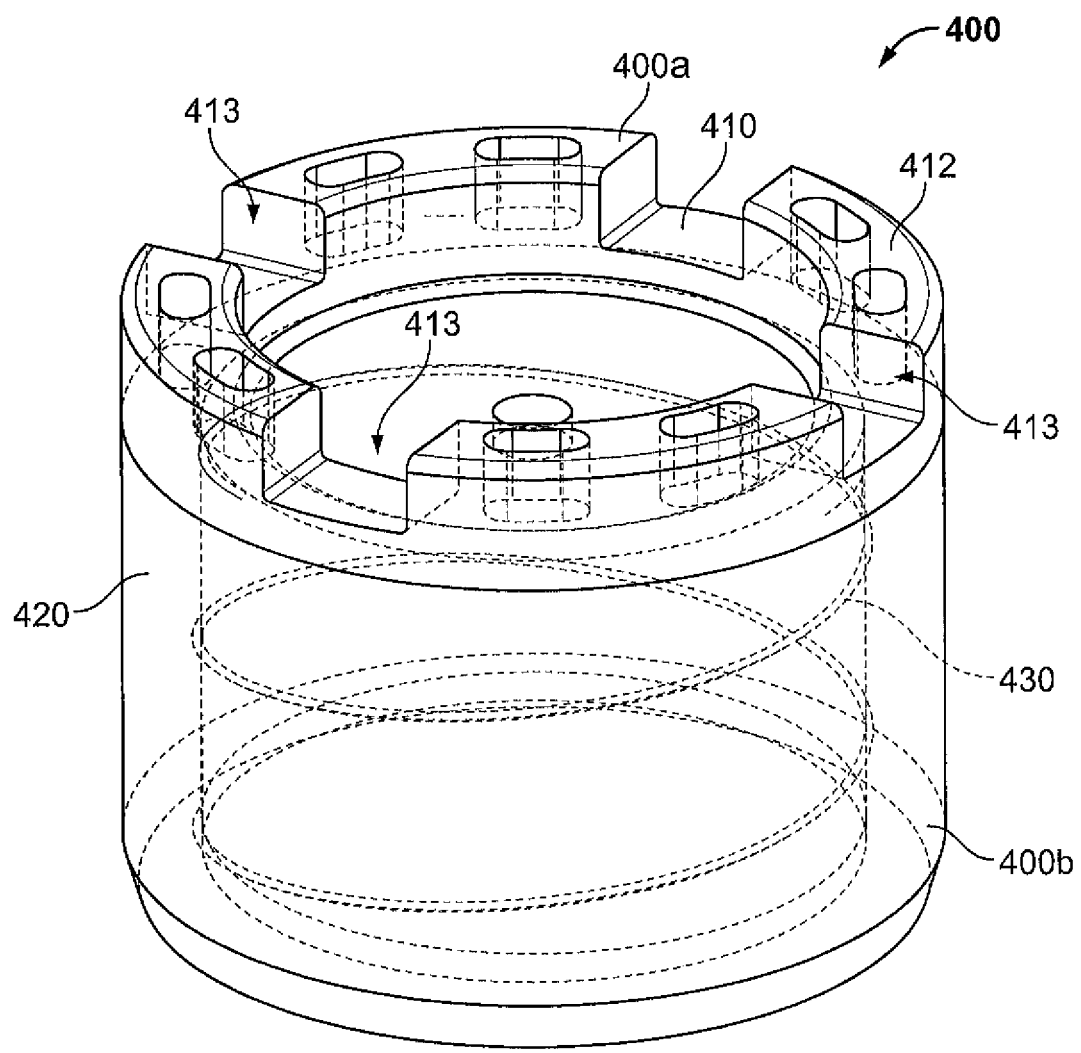
FIG. 16 is a perspective view of an embodiment of a pin end thread protector in accordance with the principles described herein.
Figure 17:
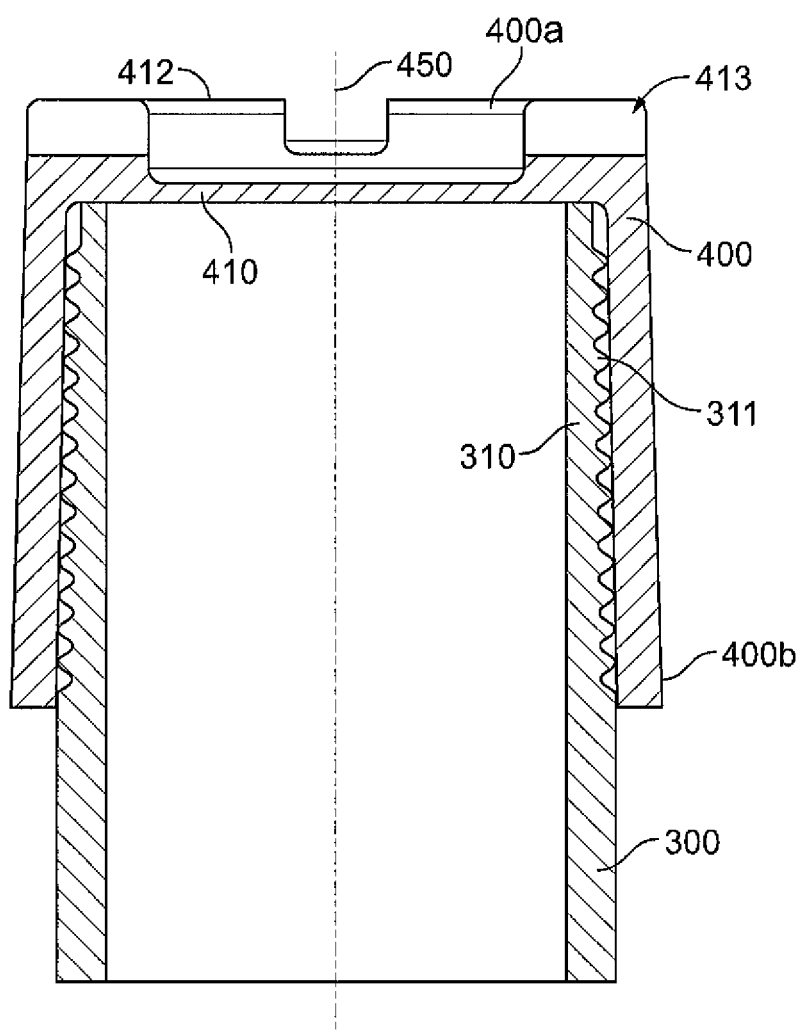
FIG. 17 is a cross-sectional view of the pin end thread protector of FIG. 16 coupled to the pin end of a pipe section.

Referring now to FIGS. 16 and 17, another embodiment of a pin end thread protector 400 in accordance with the principles described herein is shown. In FIG. 17, thread protector 400 is shown coupled to pin end 310 of pipe 300 previously described. Once mounted on pin end 310, thread protector 400 protects external threads 311 on pin end 310 from damage (e.g., impacts with other objects, corrosion, etc.).

Thread protector 400 is substantially the same as thread protector 100 previously described. Namely, thread protector 400 has a central axis 450, a first or closed end 400a and a second or open end 400b opposite first end 400a. At closed end 400a, thread protector 400 comprises a base 410. An annular connecting member 420 extends axially from base 410 to second end 400b. Since connecting member 420 receives pin end 310 of pipe 300 through open end 400b (FIG. 17), connecting member 420 may also be described as a female "box." Box 420 includes an internal thread 430 shown with hidden lines in FIG. 16. Internal thread 430 is configured the same as internal thread 130 previously described. For example, internal thread 430 has a thread pitch that is greater than the thread pitch of internal thread 311 of pin end 310.

Unlike pin end thread protector 100 previously described, in this embodiment, base 410 does not include gripping members 112. Rather, in this embodiment, base 410 includes an annular bumper 412 having a plurality of circumferentially spaced recesses 413. In this embodiment, four uniformly circumferentially spaced recesses 413 are provided. Similar to gripping members 112 previously described, recesses 413 provide a structure and mechanism for positively engaging thread protector 400 and applying rotational torque to thread protector 400 to rotate thread protector 400 about axis 450 during installation on pin end 310 (FIG. 17).

Figure 18:
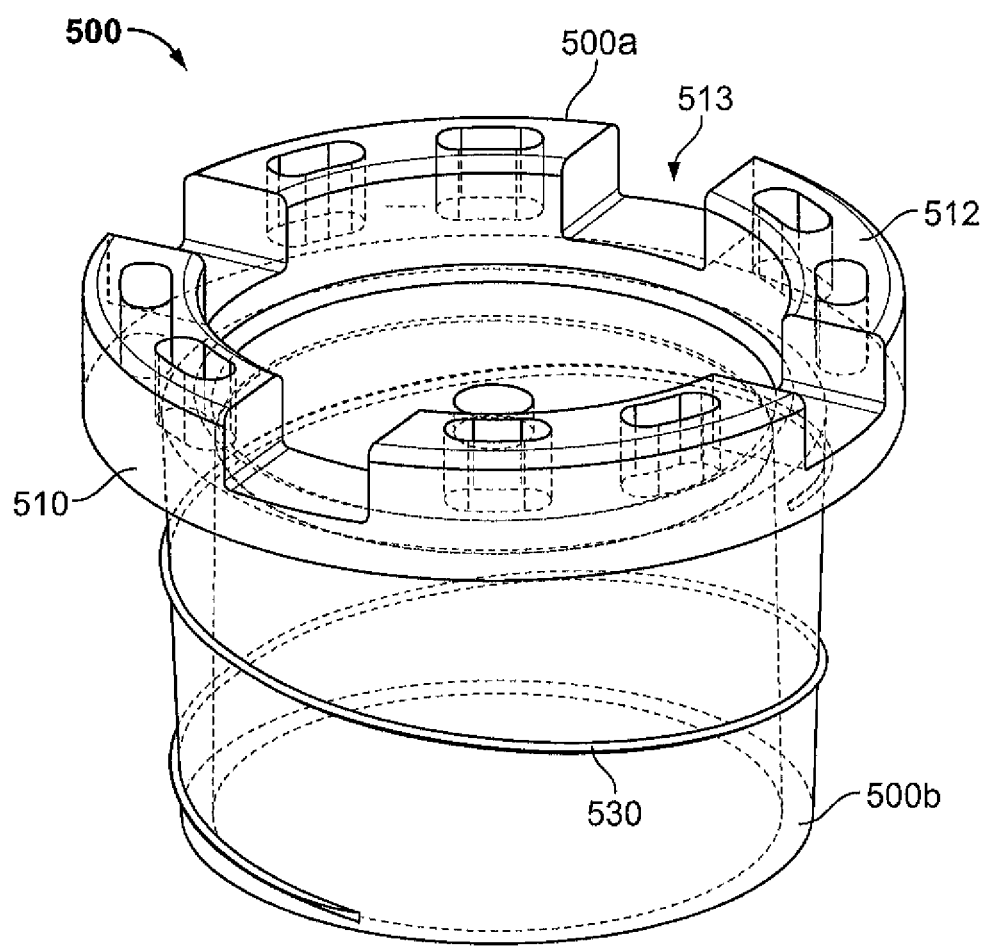
FIG. 18 is a perspective view of an embodiment of a box end thread protector in accordance with the principles described herein.
Figure 19:
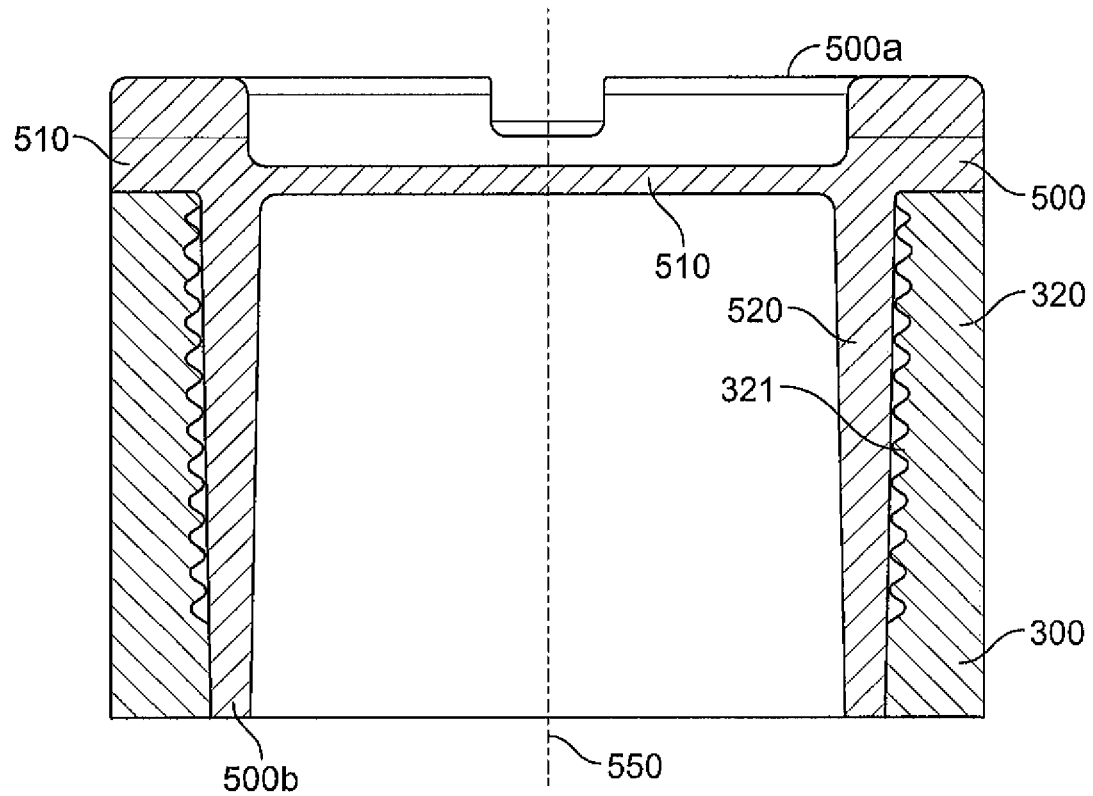
FIG. 19 is a cross-sectional view of the box end thread protector of FIG. 18 coupled to the box end of a pipe section.

Referring now to FIGS. 18 and 19, another embodiment of a box end thread protector 500 in accordance with the principles described herein is shown. In FIG. 19, thread protector 500 is shown coupled to the box end 320 of pipe 300 previously described. Once mounted, thread protector 500 protects internal threads 321 in box end 300 from damage (e.g., impacts with other objects, corrosion, etc.).

Thread protector 500 is substantially the same as thread protector 200 previously described. Namely, thread protector 500 has a central axis 550, a first or closed end 500a and a second or open end 500b opposite first end 500a. At closed end 500a, thread protector 500 comprises a base 510. An annular connecting member 520 extends axially from base 510 to second end 500b. During use, connecting member 520 extends axially into box end 320 box end 320 of pipe 300 (FIG. 19). Thus, connecting member 520 may also be described as a male "pin." Pin 520 includes an external thread 530 configured the same as internal thread 230 previously described. For example, external thread 530 has a thread pitch that is greater than the thread pitch of internal thread 321 of box end 320.

Unlike box end thread protector 200 previously described, in this embodiment, base 510 does not include gripping members 213. Rather, in this embodiment, base 510 includes an annular bumper 512 having a plurality of circumferentially spaced recesses 513. In this embodiment, four uniformly circumferentially spaced recesses 513 are provided. Similar to gripping members 312 previously described, recesses 513 provide a structure and mechanism for positively engaging thread protector 500 and applying rotational torque to thread protector 500 to rotate thread protector 500 about axis 550 during installation on pin end 310 (FIG. 19).

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A protector for protecting a pipe thread having a thread pitch $P_1$, the protector having a central axis, a first end, a second end opposite the first end, and comprising:
   a base at the first end;
   an annular connecting member extending axially from the base to the second end, the connecting member having a radially inner surface and a radially outer surface;
   wherein the connecting member includes a continuous helical thread encircling the central axis, wherein the helical thread extends radially outward from the radially outer surface or radially inward from the radially inner surface, the helical thread having a thread pitch $P_2$ that is greater than the thread pitch $P_1$ of the pipe thread.

2. The protector of claim 1, wherein the thread pitch $P_2$ is greater than one inch.

3. The protector of claim 2, wherein the thread pitch $P_2$ is between one inch and four inches.

4. The protector of claim 1, wherein the helical thread is disposed on the radially inner surface of the connecting member.

5. The protector of claim 1, wherein the helical thread has a triangular cross-section.

6. The protector of claim 1, wherein the helical thread comprises a frustoconical upper surface and a frustoconical lower surface oriented at an angle β relative to the frustoconical upper surface, wherein angle β is between 60° and 120°.

7. The protector of claim 6, wherein the frustoconical upper surface and the frustoconical lower surface intersect at an edge.

8. The protector of claim 1, wherein the radially inner surface or the radially outer surface is a frustoconical surface oriented at an acute angle relative to the central axis.

9. The protector of claim 1, wherein the helical thread is configured to cross-thread the pipe thread.

10. A method for protecting a pipe thread, the method comprising:
(a) providing a thread protector having a central axis, the thread protector comprising:
a base
an annular body extending axially from the base, the body having a radially inner surface and a radially outer surface;
a helical thread extending radially from the radially inner surface of the body or the radially outer surface of the body;
(b) intentionally cross-threading the helical thread and a pipe thread on an end of a first pipe and cutting the helical thread with the pipe thread of the first pipe.

11. The method of claim 10, wherein (b) further comprises:
(b1) coaxially aligning the thread protector and the first pipe;
(b2) rotating the thread protector about the central axis relative to the first pipe;
(b3) axially advancing the thread protector toward the end of the first pipe; and
(b4) engaging the pipe thread of the first pipe with the helical thread.

12. The method of claim 10, wherein the pipe thread of the first pipe has a thread pitch $P_1$ and the helical thread has a thread pitch $P_2$ that is greater than the thread pitch $P_1$.

13. The method of claim 11, wherein the thread pitch $P_2$ is greater than one inch.

14. The method of claim 10, further comprising (g) forming an annular seal between the base of the thread protector and a terminal end of the first pipe.

15. The method of claim 10, wherein the end of the first pipe is a pin end and the helical thread is disposed on the radially inner surface of the connecting member.

16. The method of claim 10, wherein the end of the first pipe is a box end, and the helical thread is disposed on the radially outer surface of the connecting member.

17. The method of claim 11, wherein the helical thread has a triangular cross-section.

18. The method of claim 17, wherein the helical thread comprises a frustoconical upper surface and a frustoconical lower surface oriented at an angle $\beta$ relative to the frustoconical upper surface, wherein the angle $\beta$ is 90°.

19. The method of claim 10, further comprising:
(c) removing the thread protector from the end of the first pipe after (b); and
(d) intentionally cross-threading the helical thread and a pipe thread of a second pipe.

20. The method of claim 19, wherein (d) further comprises:
(d1) coaxially aligning the thread protector and the second pipe;
(d2) rotating the thread protector about the central axis relative to the second pipe;
(d3) axially advancing the thread protector toward the end of the second pipe; and
(d4) engaging the pipe thread of the second pipe with the helical thread.

21. The method of claim 19, wherein the pipe thread of the second pipe has a thread pitch $P_3$ that is less than thread pitch $P_1$ of the helical thread.

22. The method of claim 20, wherein the thread pitch $P_2$ is greater than one inch.

23. The method of claim 20, wherein (d) further comprises cutting the helical thread with the pipe thread of the second pipe.

24. The protector of claim 1, wherein the continuous helical thread extends axially from the second end to the base.

25. The protector of claim 1, wherein the continuous helical thread extends angularly at least 360° about the central axis.

* * * * *